United States Patent
Davis et al.

(10) Patent No.: US 10,159,196 B2
(45) Date of Patent: *Dec. 25, 2018

(54) MOBILE TREE CANOPY TREATMENT SYSTEM

(71) Applicant: Skavis Corporation, Woodstock, GA (US)

(72) Inventors: Randall James Davis, Woodstock, GA (US); Charles Francis Noll, Jr., Woodstock, GA (US); Tom Wallis Airhart, Lubbock, TX (US); James Seth Niece, Woodstock, GA (US); Brian Lee Kelley, Dundee, FL (US); Matthew Phillip Vogel, Acworth, GA (US)

(73) Assignee: Skavis Corporation, Woodstock, GA (US)

( * ) Notice: Subject to any disclaimer, the term of this patent is extended or adjusted under 35 U.S.C. 154(b) by 479 days.

This patent is subject to a terminal disclaimer.

(21) Appl. No.: 14/843,413

(22) Filed: Sep. 2, 2015

(65) Prior Publication Data

US 2016/0057941 A1 Mar. 3, 2016

Related U.S. Application Data

(60) Provisional application No. 62/152,558, filed on Apr. 24, 2015.

(51) Int. Cl.
*A01G 7/06* (2006.01)
*A01G 13/06* (2006.01)
(Continued)

(52) U.S. Cl.
CPC ............... *A01G 7/06* (2013.01); *A01G 13/02* (2013.01); *A01G 13/0206* (2013.01);
(Continued)

(58) Field of Classification Search
CPC ...... A01G 13/06; A01G 13/065; A01G 13/02; A01G 7/06; A01G 1/001; A01G 13/0206;
(Continued)

(56) References Cited

U.S. PATENT DOCUMENTS 947,519 A 1/1910 McAdie
1,126,426 A 1/1915 Eddy
(Continued)

FOREIGN PATENT DOCUMENTS

WO 9921418 5/1999

OTHER PUBLICATIONS

Ehsani, Reza J.; Third Party Submission for U.S. Appl. No. 14/699,156, filed Apr. 29, 2015, dated Jun. 10, 2016, 84 pgs.
(Continued)

*Primary Examiner* — Joshua D Huson
(74) *Attorney, Agent, or Firm* — Taylor English Duma LLP

(57) ABSTRACT

A tree canopy treatment system includes: a supply unit configured to heat a fluid; and a treatment unit in fluid communication with the supply unit, the treatment unit configured to move independently from the supply unit. A method of treating a tree includes positioning a temperature transmitter proximate to the tree; and lowering a treatment unit over the tree and the temperature transmitter, the treatment unit configured to move independently from a supply unit, the treatment unit in fluid communication with the supply unit.

17 Claims, 22 Drawing Sheets

(51) Int. Cl.
*A01G 13/02* (2006.01)
*A01G 13/08* (2006.01)
*G05B 15/02* (2006.01)
*G05D 7/06* (2006.01)
*G05D 23/19* (2006.01)

(52) U.S. Cl.
CPC ............. *A01G 13/06* (2013.01); *A01G 13/08* (2013.01); *G05B 15/02* (2013.01); *G05D 7/0629* (2013.01); *G05D 7/0676* (2013.01); *G05D 23/19* (2013.01); *G05D 23/1917* (2013.01); *A01G 13/065* (2013.01)

(58) Field of Classification Search
CPC ...... A01G 13/08; G05B 15/02; G05D 7/0629; G05D 7/0676; G05D 23/19; G05D 23/1917
See application file for complete search history.

(56) References Cited

U.S. PATENT DOCUMENTS

| | | | |
|---|---|---|---|
| 1,820,040 | A | 8/1931 | Zuckerman |
| 1,834,084 | A | 12/1931 | Barnes |
| 3,205,885 | A | 9/1965 | Baxley |
| 3,296,739 | A | 1/1967 | Wiegel |
| 3,395,485 | A | 8/1968 | Rooklidge |
| 3,788,542 | A * | 1/1974 | Mee ...................... A01G 13/065 239/11 |
| 3,830,014 | A | 8/1974 | Baker |
| 4,015,366 | A | 4/1977 | Hall, III |
| 4,787,173 | A | 11/1988 | Lewis |
| 5,099,602 | A | 3/1992 | Arnold et al. |
| 5,228,621 | A | 7/1993 | Wilson et al. |
| 5,575,109 | A | 11/1996 | Kuntz |
| 5,662,267 | A | 9/1997 | Hulls |
| 5,848,492 | A | 12/1998 | Brown |
| 5,897,057 | A * | 4/1999 | Hulls ................... A01M 7/0014 239/104 |
| 6,047,900 | A | 4/2000 | Newson et al. |
| 6,257,498 | B1 | 7/2001 | Siebol |
| 6,698,135 | B1 | 3/2004 | Robbins |
| 7,533,487 | B1 | 5/2009 | Mantkowski et al. |
| 7,637,053 | B1 | 12/2009 | McAnulty |
| 7,645,091 | B2 | 1/2010 | Wallace |
| 7,650,716 | B1 | 1/2010 | Schemeley |
| 7,849,631 | B2 | 12/2010 | Marc |
| D659,587 | S | 5/2012 | Willsie |
| 8,225,545 | B1 | 7/2012 | Collins |
| 8,683,741 | B2 | 4/2014 | Castagno et al. |
| 9,949,446 | B2 | 4/2018 | Davis et al. |
| 9,949,447 | B2 | 4/2018 | Davis et al. |
| 10,028,450 | B2 | 7/2018 | Davis et al. |
| 2002/0050095 | A1 | 5/2002 | McMullin |
| 2004/0232140 | A1 | 11/2004 | Kanzaki et al. |
| 2005/0217484 | A1 | 10/2005 | Bourgault et al. |
| 2007/0187635 | A1 | 8/2007 | Jost |
| 2009/0293349 | A1 | 12/2009 | Dunbar |
| 2010/0286833 | A1 | 11/2010 | Kaprielian |
| 2011/0024281 | A1 | 2/2011 | Kemp |
| 2011/0247264 | A1* | 10/2011 | Luciano, Jr. ......... A01G 13/065 47/2 |
| 2013/0160357 | A1* | 6/2013 | Luciano, Jr. ......... A01G 13/065 47/2 |
| 2013/0308675 | A1 | 11/2013 | Sneed et al. |
| 2015/0053151 | A1 | 2/2015 | Graff |
| 2015/0087893 | A1 | 3/2015 | Hill et al. |
| 2015/0305254 | A1* | 10/2015 | Ehsani ................ A01G 13/0212 47/57.7 |
| 2016/0057941 | A1 | 3/2016 | Davis |
| 2016/0062369 | A1* | 3/2016 | Davis .................... G05B 15/02 700/282 |
| 2016/0174475 | A1* | 6/2016 | Mirzakhani Nafchi ..................... A01G 7/06 47/1.3 |
| 2017/0332559 | A1 | 11/2017 | Davis |
| 2018/0199520 | A1 | 7/2018 | Davis et al. |
| 2018/0295789 | A1 | 10/2018 | Davis et al. |

OTHER PUBLICATIONS

U.S.Department of Agriculture; Article entitled: "Proceedings of the Eight Annual Meeting of the Association of Economic Entomologists", Division of Entomology, 1896, 20 pgs.
ScoringAg, Inc.; Article entitled: "The TreeSteamer invented by ScoringAg, Inc. beats HLB Citrus Greening", published May 24, 2014, 2 pgs.
Southeast AgNET; Article entitled: "Citrus Tree Steamer Attends Citrus Expo," located at <http://southeastagnet.com/2015/08/26/citrustreesteamerattendscitrusexpo/>, publicly available prior to Oct. 1, 2015, 8 pgs.
Southeast AgNET; Article entitled: "Thermotherapy Field Day", located at <http://southeastagnet.com/2015/07/13/thermotherapyfieldday/>, publicly available prior to Oct. 1, 2015, 8 pgs.
YouTube; Screenshots of video entitled: "Efficiency and Advances in Thermotherapies Against HLB", located at <https://www.youtube.com/watch?v=-FBVamFn_Zg>; publicly available prior to Oct. 1, 2015, 5 pgs.
ScoringAg, Inc.; Article entitled: "Operating pictures The TreeSteamer Tunnel model", located at <http://scoringag-equipment.com/product-template6.html>, publicly available prior to Oct. 1, 2015, 2 pgs.
YouTube; Screenshots of video entitled: "Efficiency and Advances in Thermotherapies Against HLB", located at <https://www.youtube.com/watch?v=-FBVamFn_Zg>, publicly available prior to Oct. 1, 2015, 1 pg.
USDA; Article entitled "Prescription for Curing Citrus Greening: Apply Heat and Wait", located at http://www.ars.esda.gov/is/AR/archive/aug13/citrus0813.htm>, accessed on Feb. 25, 2015, 2 pgs.
Kanitz, William; Article entitled: "Mobile Steam Delivery Platform Engineered by ScoringAg, Inc.", [online web page, bearing publication date of Oct. 15, 2014, 2 pgs. Retrieved on Dec. 4, 2015 from the Internet: <http://www.przoom.com/news/147492/>.
Kanitz, William; Article entitled: "TreeSteamer-Batch by ScoringAg for citrus greening and other citrus diseases", [online web page], earliest available data from the Internet Archive (Wayback machine) for higher-level, parent web page (data for the web page itself unavailable) bears a date of Nov. 7, 2014, 1 pg. Retrieved on Dec. 4, 2015 from the Internet: <http://scoringag-equipment.com/hardCopy/TreeSteamer-BatchC.pdf>.
ScoringAg, Inc.; Article entitled "The TreeSteamer Trailer Model by ScoringAg", [online web page], bearing a copyright date of Mar. 17, 2015, 1 pg. Retrieved on Dec. 4, 2015 from the Internet: <http://scoringag-equipment.com/hardCopy/tflyerTrailerModel.pdf>.
Fresh Plaza; Article entitled: "Steam heat natural solution to greening disease", [online web page], bearing a publication date of Nov. 21, 2014, 2 pgs. Retrieved on Dec. 4, 2015 from the Internet: <http://www.freshplaza.com/article/131444/Steam-heat-natural-solution-to-greening-disease>,
ScoringAg, Inc.; Article entitled: "Operating pictures TreeSteamer-Mini", [online web page], earliest available data from the Internet Archive (Wayback Machine) for the web page bears a date of Oct. 2, 2015, 2 pgs. Retrieved on Dec. 4, 2015 from the Internet: <http://scoringag-equipment.com/product-template8.html>.
ScoringAg, Inc.; Article entitled "TreeSteamer-Mini Model by ScoringAg", [online web page], bearing a copyright date of Apr. 9, 2015, 1 pg. Retrieved on Dec. 4, 2015 from the Internet: <http://scoringag-equipment.com/hardCopy/TreeSteamerCMini.pdf>.
Davis, Randall James; International Search Report and Written Opinion for serial No. PCT/US15/53615, filed Oct. 1, 2015, dated Jan. 29, 2016, 14 pgs.
ScoringAg, Inc.; Article entitled: "Operating pictures TreeSteamer Trailer Model 14' or 21'", [online web page], earliest available data from the Internet Archive (Wayback Machine) for the web page bears a date of Oct. 2, 2015, 2 pgs. Retrieved on Dec. 4, 2015 from the Internet: <http://scoringag-equipment.com/product-template7.html>.

(56) References Cited

OTHER PUBLICATIONS

Davis, Randall James; U.S. Patent Application entitled: Canopy Treatment System having U.S. Appl. No. 14/872,899, filed Oct. 1, 2015, 80 pgs.
Davis, Randall James; U.S. Patent Application entitled: Control System for a Canopy having U.S. Appl. No. 14/872,976, filed Oct. 1, 2015, 79 pgs.
Ehansi, Reza J.; U.S. Patent Application entitled: Methods and Devices for Reduction of Plant Infections, having U.S. Appl. No. 14/699,156, filed Apr. 29, 2015, 55 pgs.
Ehsani, Reza J.; U.S. Provisional Application entitled: Methods and Devices for Reduction of Plant Infections, having U.S. Appl. No. 61/985,638, filed Apr. 29, 2014, 30 pgs.
Davis, Randall James; PCT Application entitled: Canopy Treatment System and Control System having serial No. PCT/US15/53615, filed Oct. 1, 2015, 89 pgs.
Noll, Charles F.; U.S. Provisional Application entitled: Mobile Tree Canopy Treatment, having U.S. Appl. No. 62/152,558, filed Apr. 24, 2015, 39 pgs.
Deng, X, et al.; "Heat treatment of Huanglongbing-affected citrus trees in field for reduction of Candidatus Liberibacter asiaticus"; Published Nov. 8, 2012; USDA; 1 page.
Duan, Ping, et al.; Development and Implementation of New Control Strategies for Citrus Huanglongbing (Greening); 2012 Annual Report; USDA; 2 pgs.
Hoffman, et al.; Heat treatment eliminates 'Candidatus Liberibacter asiaticus' from infected citrus trees under controlled conditions; Published Jan. 1, 2013; USDA; 2 pgs.
Davis, Randall James; Non-Final Office Action for U.S. Appl. No. 14/872,899, filed Oct. 1, 2015, dated Sep. 1, 2017, 41 pgs.
Davis, Randall James; Non-Final Office Action for U.S. Appl. No. 15/671,563, filed Aug. 8, 2017, dated Sep. 1, 2017, 19 pgs.
Davis, Randall James; Non-Final Office Action for U.S. Appl. No. 14/872,976, filed Oct. 1, 2015, dated Oct. 4, 2017, 39 pgs.
Davis, Randall James; International Preliminary Report on Patentability for PCT No. PCT/US15/53615, filed Oct. 1, 2015, dated Nov. 2, 2017, 11 pgs.
Davis, Randall James; Restriction Requirement for U.S. Appl. No. 14/872,899, filed Oct. 1, 2015, dated Jun. 12, 2017, 7 pgs.
Ehsani, Reza J.; Non-final Office Action for U.S. Appl. No. 14/699,156, filed Apr. 29, 2015, dated May 16, 2017, 36 pgs.
Davis, Randall James; Issue Notification for U.S. Appl. No. 14/872,899, filed Oct. 1, 2015, dated Apr. 4, 2018, 1 pg.
Davis, Randall James; Supplemental Notice of Allowance for U.S. Appl. No. 14/872,899, filed Oct. 1, 2015, dated Mar. 22, 2018, 6 pgs.
Davis, Randall James; Issue Notification for U.S. Appl. No. 15/671,563, filed Aug. 8, 2017, dated Apr. 4, 2018, 1 pg.
Davis, Randall James; Supplementary Notice of Allowance for U.S. Appl. No. 15/671,563, filed Aug. 8, 2017, dated Mar. 26, 2018, 6 pgs.
Davis, Randall James; Notice of Allowance for U.S. Appl. No. 14/872,976, filed Oct. 1, 2015, dated Mar. 30, 2018, 29 pgs.
Ehsani, Reza J.; Non-Final Office Action for U.S. Appl. No. 14/699,156, filed Apr. 29, 2015, dated Apr. 19, 2018, 25 pgs.
Davis, Randall James; Notice of Allowance for U.S. Appl. No. 14/872,899, filed Oct. 1, 2015, dated Jan. 11, 2018, 16 pgs.
Davis, Randall James; Notice of Allowance for U.S. Appl. No. 15/671,563, filed Aug. 8, 2017, dated Dec. 18, 2017, 16 pgs.
Davis, Randall James; Supplemental Notice of Allowance for U.S. Appl. No. 15/671,563, filed Aug. 8, 2017, dated Jan. 16, 2018, 7 pgs.
Davis, Randall James; Issue Notification for U.S. Appl. No. 14/872,976, filed Oct. 1, 2015, dated Jul. 4, 2018, 1 pg.
Ehsani, Reza J.; Final Office Action for U.S. Appl. No. 14/699,156, filed Apr. 29, 2015, dated Sep. 11, 2018, 20 pgs.

* cited by examiner

MOBILE TREE CANOPY TREATMENT SYSTEM

REFERENCE TO RELATED APPLICATIONS

This application claims the benefit of U.S. Provisional Application No. 62/152,558, filed Apr. 24, 2015, which is hereby specifically incorporated by reference herein in its entirety.

TECHNICAL FIELD

This disclosure relates to tree canopy treatment systems. More specifically, this disclosure relates to mobile tree canopy treatment systems.

BACKGROUND

Plants, such as fruit trees and nut trees, may be susceptible to various types of diseases. These diseases may be caused by bacteria, viruses, algae, fungi, chemicals, and various other pathogens and may impact the diseased plant's mortality, health, growth, and reproduction. For example, various diseases, such as Citrus Greening Disease, which is also known as Huanglongbing (HLB), may kill or irreparably damage young plants before reaching reproductive age, may affect reproductive output, or may directly affect various flowers and fruits of the plant.

SUMMARY

Disclosed is a tree canopy treatment system including: a supply unit configured to heat a fluid; and a treatment unit in fluid communication with the supply unit, the treatment unit configured to move independently from the supply unit.

Also disclosed is a tree canopy treatment system including: a supply unit configured to heat a fluid; a treatment unit in fluid communication with the supply unit; and a system controller configured to control the flow rate of the fluid between the supply unit and the treatment unit.

Also disclosed is a method of treating a tree, the method including: positioning a temperature transmitter proximate to the tree; and lowering a treatment unit over the tree and the temperature transmitter, the treatment unit configured to move independently from a supply unit, the treatment unit in fluid communication with the supply unit.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
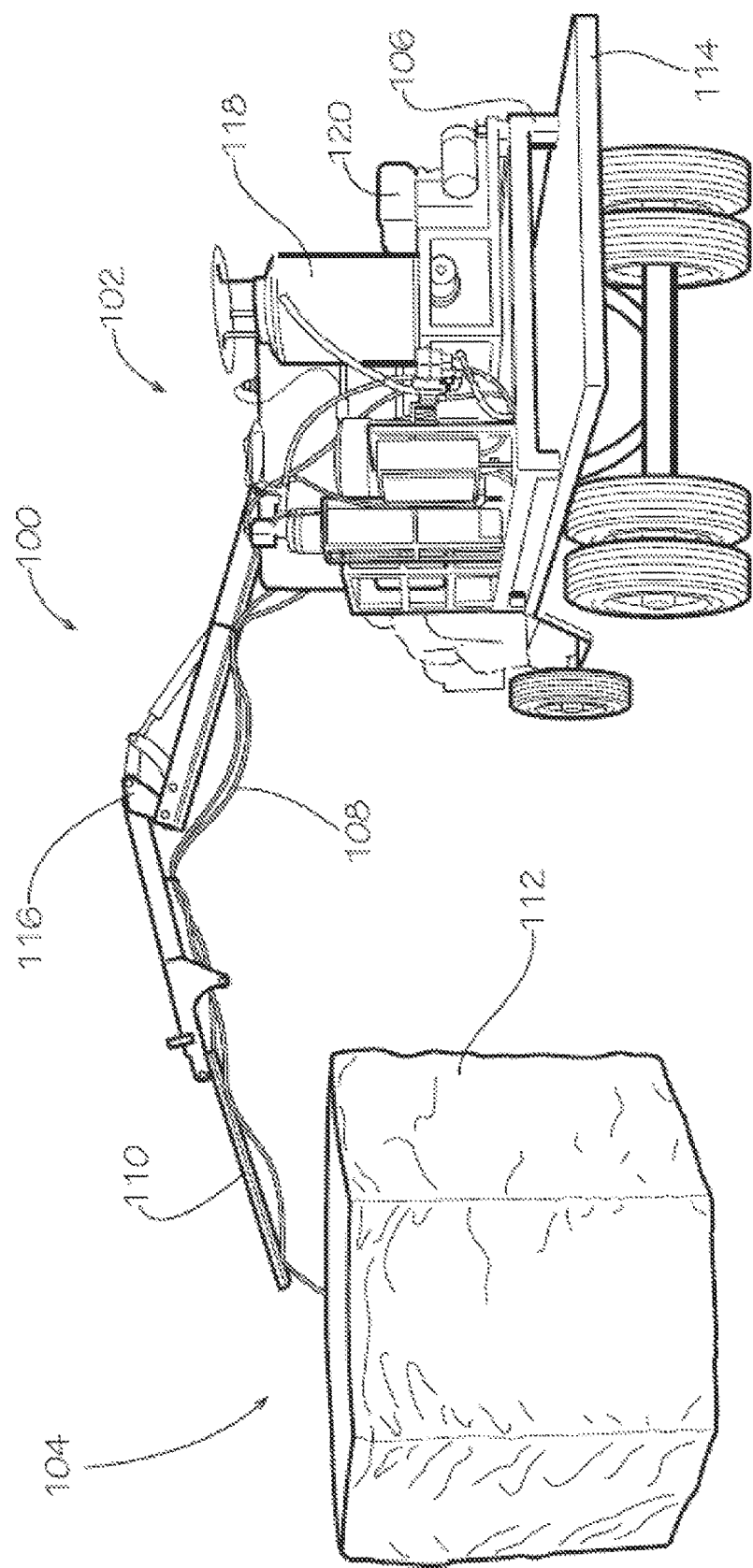
FIG. 1 is a perspective view of a tree canopy treatment system according to an embodiment of the present disclosure including a supply portion having a base and a treatment portion having an extension and a treatment canopy.

Disclosed is a tree canopy treatment system and associated methods, systems, devices, and various apparatus. The tree canopy treatment system includes a mobile base and an extension with a treatment apparatus. It would be understood by one of skill in the art that the disclosed mobile tree canopy treatment system is described in but a few exemplary embodiments among many. No particular terminology or description should be considered limiting on the disclosure or the scope of any claims issuing therefrom. Directional references such as "up," "down," "top," "left," "right," "front," "back," and "corners," among others are intended to refer to the orientation as shown and described in the figure (or figures) to which the components and directions are referencing.

Plants, such as various trees, flowers, bushes, crops, herbs, and various other types of plants, may be infected with one or more diseases that may negatively impact the respective plants. For example, diseases may damage or even kill portions of the plants such as branches, leaves, flowers, nuts, and fruits. A non-limiting example of a specific disease affecting plants is the Huanglongbing (HLB) virus, commonly known as the Citrus Greening Disease, which infects citrus plants. The Citrus Greening Disease affects citrus plants by causing the infected trees to have, for example, stunted growth, bear multiple off-season flowers, most of which fall off, and produce small, irregularly-shaped, and bitter tasting fruit with a portion of the peel that remains green. Controlling diseases such as the Citrus Greening Disease, may be difficult as some diseases may have no known cure and infected plants may be difficult to maintain and keep alive.

The present disclosure describes various methods, systems, devices, and apparatus for treating infected plants with a heated fluid. In one embodiment, a method may include providing a steam environment in which an infected plant is treated. The method may include treating the infected plant at a specific temperature for a specific time such that the disease may be treated without killing the infected plant or damaging existing fruit.

In another embodiment, the tree canopy treatment structure may include a base portion and a treatment portion. The tree canopy treatment structure may be mobile. The supply portion may include a burner and pump configured to generate pressurized and heated fluid that is supplied to the treatment portion. The burner and pump are controllable such that the outlet fluid from the supply portion is maintained within a particular range of temperatures and pressures.

The treatment portion may include a canopy that at least partially encloses the treatment region. In various embodiments, the treatment region is defined by a treatment ring. The treatment portion may be vertically and horizontally positioned relative to the supply portion such that a tree or plant to be treated is positioned at least partially within the treatment region of the treatment portion during treatment.

The treatment ring may include a nozzle. The nozzle may introduce the heated and pressurized fluid from the supply portion into the treatment region. The heated and pressurized fluid may be introduced into the treatment region in a mist form. The nozzle may be orientated such that the heated and pressurized fluid introduced into the treatment region creates a vortex whereby the heated mist is forced to circulate through and around the infected plant.

The tree canopy treatment system may include a system controller configured to monitor the temperature of the treatment region and shut off the flow of heated fluid through the nozzle when a desired treatment time has been achieved. The system controller may also be configured to monitor a temperature of the tree or a temperature within the treatment region. Exposing the infected plant to an environment at a specific temperature of a specific time may reduce the rate or amount of disease infection in a plant without killing the infected plant.

One embodiment of a tree canopy treatment system 100 for tree canopy treatment is disclosed and described in FIG. 1. The tree canopy treatment system 100 includes a supply portion 102 and a treatment portion 104. The supply portion 102 is a supply unit and the treatment portion 104 is a treatment unit.

In various embodiments, the supply portion 102 includes a hot water generator 118 and pump 120 positioned on a base 106. The hot water generator 118 and pump 120 are in fluid communication with each other and generate a fluid output from the supply portion 102 at a specified temperature and pressure. In the present embodiment, the fluid is water and the fluid output is water output; however, in various other embodiments, the fluid may be any desirable fluid or vapor for tree canopy treatment. The hot water generator 118 is adjustable to control the temperature of the water output of the supply portion 102. The pump 120 is adjustable to control the pressure of the water output of the supply portion 102 in various embodiments. The flow is adjustable through a recirculation valve 1900 (illustrated in FIG. 19), which is downstream of the pump 120. The water output of the supply portion 102 is transported to the treatment portion 104 via hosing 108; however, the disclosure of hosing 108 should not be considered limiting on the current disclosure as in various other embodiments, other connecting mechanisms such as piping, tubing, and various other mechanisms enabling fluid communication between the supply portion 102 and the treatment portion 104 may be utilized.

Figure 8:
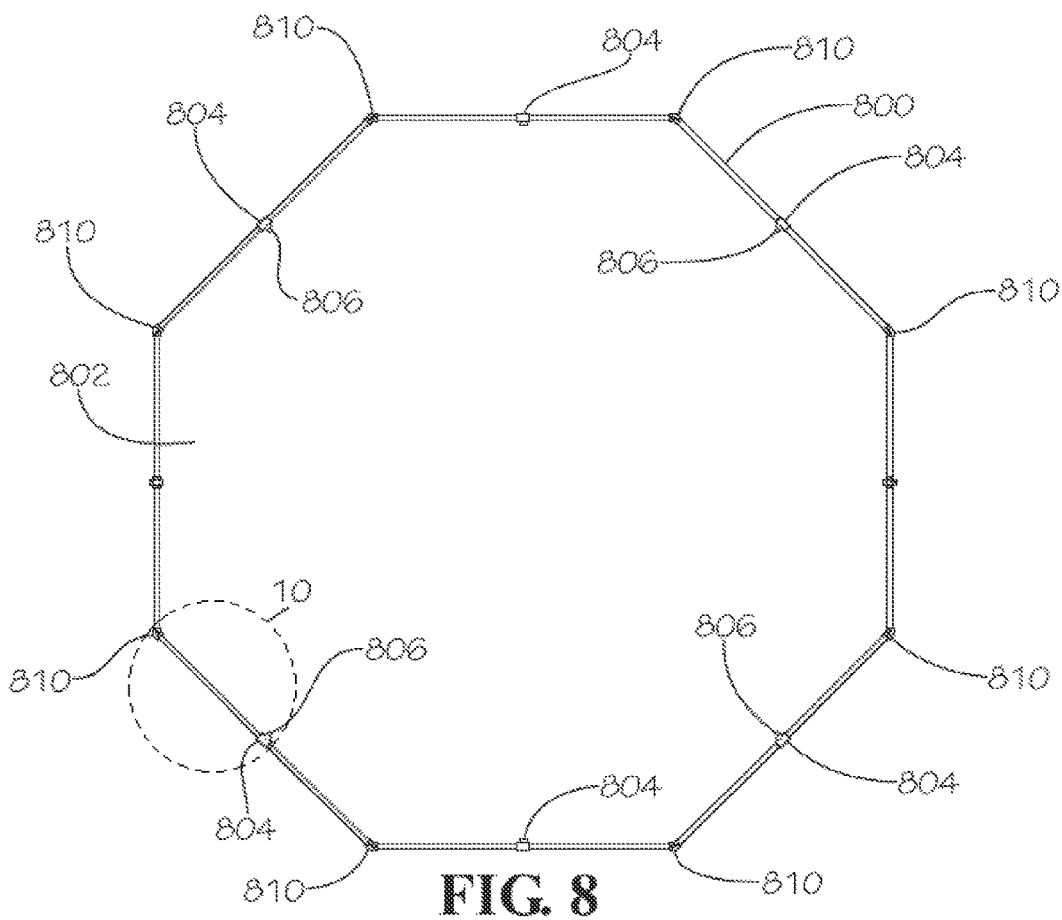
FIG. 8 is a top view of a treatment ring of the treatment portion of FIG. 1.

The treatment portion 104 includes a canopy 112 and at least one treatment ring 800 (shown in FIG. 8). In various embodiments, the at least one treatment ring 800 sprays the hot pressurized water output from the supply portion 102 through nozzles 806 (shown in FIG. 8) on the treatment ring 800, as is described in greater detail below. In various embodiments, the nozzles 806 on the treatment ring 800 atomize the hot water into steam for treatment of the tree to be treated. When the atomized hot water condenses within the treatment portion 104, heat is released into the air within a treatment region 802 of the treatment ring 800.

The canopy 112 is draped around and surrounds the treatment ring 800 to contain moisture and heat within the treatment region 802 of the treatment ring 800. In various embodiments, the canopy 112 includes any material suitable for moisture and heat retention, such as those materials from the group including, but not limited to, various polymers, textiles, plastics, metal sheets, composites, and various other suitable material.

In various embodiments, a jib 110 is connected to the at least one treatment ring 800 through a connection mechanism such as hooks, hooks and loops, buckles, clasps, pins, bolts, screws, and various other similar connection mechanisms. The jib 110 may be utilized in various embodiments for aiding in raising, lowering, and positioning the treatment portion 104. In various other embodiments, the jib 110 may be omitted from the treatment portion 104. In various other embodiments, the treatment portion 104 may include a plurality of canopies and treatment rings such that the tree canopy treatment system 100 may treat multiple plants at once.

The tree canopy treatment system 100 is mobile in various embodiments. In various embodiments, the base 106 provides the mobility for the tree canopy treatment system 100. In various embodiments, as shown in FIG. 1, the base 106 is mounted on a converted vehicle 114, such as those used for collecting citrus fruit. In various other embodiments, the base 106 may be mounted on various other types of vehicles, converted vehicles, and various other transporting mechanisms. In various embodiments, the base 106 is equipped with its own movement mechanism and includes a movement mechanism such as wheels, sliders, rollers, or various other movement mechanisms connected to the base 106.

As shown in FIG. 1, in various embodiments, the converted vehicle 114 includes an elevating mechanism 116. In the present embodiment, the elevating mechanism 116 is a boom arm mounted on the converted vehicle 114. In various embodiments, the jib 110 is connected to the elevating mechanism 116 through a connection mechanism such as hooks, hooks and loops, buckles, clasps, pins, bolts, screws, and various other similar connection mechanisms. In various embodiments, the elevating mechanism 116 allows for horizontal and vertical movement of the treatment portion 104 relative to the supply portion 102 such that the treatment portion 104 is adaptable to treat various sized plants relative to the base 106. In various embodiments, the elevating mechanism 116 may also be used to guide the hosing 108 from the supply portion 102 to the treatment portion 104. In embodiments where the converted vehicle 114 or other transporting mechanism does not include the elevating mechanism 116, the jib 110 may be connected to various other elevating mechanisms, such as lifts, cranes, pulleys, gears, and any other suitable elevating mechanism for selectively raising and lowering the canopy 112 through the jib 110 during a treatment process, as is described in greater detail below. The various elevating mechanisms may be part of the converted vehicle 114 or may be structures, components, or mechanisms independent from the converted vehicle 114.

Figure 2:
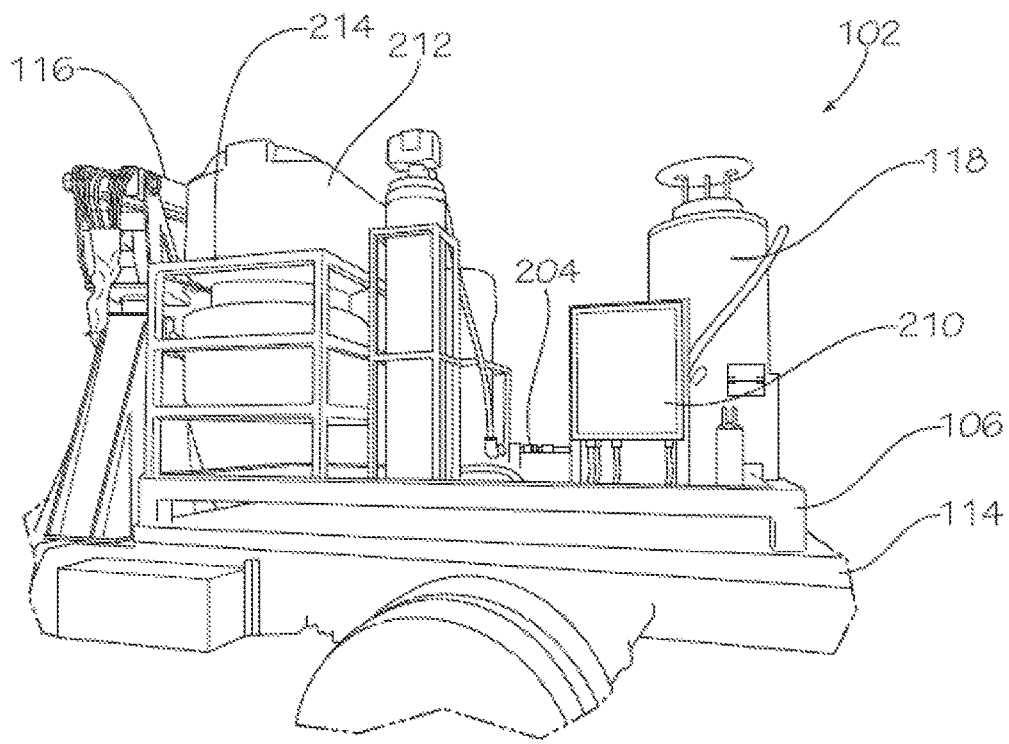
FIG. 2 is a perspective view of the supply portion of the tree canopy treatment system of FIG. 1 positioned on a converted vehicle.
Figure 3:
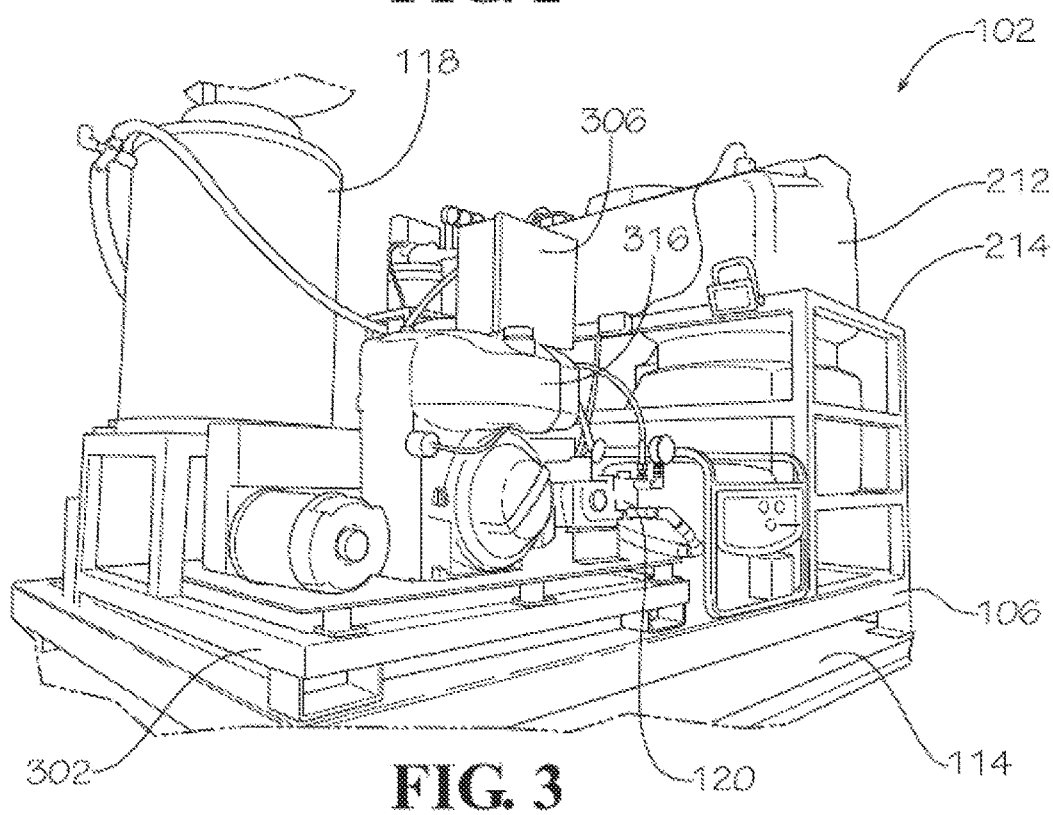
FIG. 3 is another perspective view of the supply portion of the tree canopy treatment system of FIG. 1.

FIGS. 2 and 3 show the supply portion 102 of the tree canopy treatment system 100. As previously described and as shown in FIG. 3, in various embodiments, the supply portion includes the hot water generator 118 and pump 120 positioned on the base 106.

In various embodiments, the base 106 includes a steam generator skid 302. As illustrated in FIGS. 2 and 3, the pump 120 and hot water generator 118 are positioned on the steam generator skid 302 in various embodiments. However, the disclosure of the steam generator skid 302 should not be considered limiting on the current disclosure as the hot water generator 118 and pump 120 may be positioned as desired on the base 106 in various other embodiments.

In various embodiments, the hot water generator 118 is a liquid fuel fired hot water generator 118 that utilizes a burner 1802 (illustrated in FIG. 18) to heat the fluid flowing through the hot water generator 118; however, in various other embodiments, the hot water generator 118 is any suitable type of hot water generator 118 capable of heating fluid, such as water, of the supply portion 102. In various embodiments, the hot water generator 118 is adjustable and may heat water to a desired temperature. In various other embodiments, the flow of water through the hot water generator 118 is adjustable through the recirculation valve 1900 (illustrated in FIG. 19) to get a desired heated fluid temperature.

The supply portion 102 is controllable to heat and maintain a desired outlet water temperature. For example, in various embodiments where the tree canopy treatment system 100 is used to treat Citrus Greening Disease, the hot water generator 118 may heat water to temperatures between 210° F. and 260° F., such as between 210° F. and 250° F., such as between 225° F. and 245° F., such as about 235° F.; however, in various other embodiments, the hot water generator 118 may heat water to various other temperatures suitable for treating Citrus Greening Disease or other various diseases. In various other embodiments, the hot water generator 118 heats the water to a sufficient temperature such that the treatment portion 104 heats a diseased tree to a sufficient temperature for treatment. In various embodiments, the hot water generator 118 heats the water to a sufficient temperature such that the treatment portion 104 heats the treatment portion to temperatures between 119° F. and 135° F., such as between 121° F. and 131° F., such as about 126° F. In various other embodiments, the tree may be heated to other temperatures sufficient to treat the tree. The disclosure of a tree as the item to be treated should not be considered limiting on the current disclosure.

The pump 120 is in fluid communication with the hot water generator 118. Portion. In various embodiments, the pump 120 adjustably pressurizes the water within the tree canopy treatment system 100 to a desired pressure or flow. In various embodiments, the pump 120 pumps water to the hot water generator 118 from a water supply source. In various embodiments, the water supply source is external to the supply portion 102. In various other embodiments, as shown in FIGS. 2 and 3, the water supply source is a water tank 212 positioned on the base 106 and in fluid communication with the pump 120 and hot water generator 118. As shown in FIGS. 2 and 3, in various embodiments, the base 106 includes a tank railing 214 for retaining the water tank 212 on the base 106; however, the disclosure of the tank railing 214 should not be considered limiting on the current disclosure.

In addition to the hot water generator 118 and the pump 120, in various embodiments, the supply portion 102 includes additional components utilized with the tree canopy treatment system 100. As shown in FIG. 2, in various embodiments, the supply portion 102 includes a pressure regulator 204. In various embodiments, the pressure regulator 204 regulates outlet pressure from the pump 120 at safe and usable pressures. The pressure regulator may be positioned on the base 106 in various embodiments, as shown in FIG. 2. As shown in FIG. 3, in various embodiments, the supply portion 102 includes a burner control wiring enclosure 306 on the base 106. In various embodiments, the burner control wiring enclosure 306 includes a burner controller (not illustrated) and controls for various components of the supply portion 102 such as the hot water generator 118, pump 120, and various other components. As shown in FIG. 3, in various embodiments, the supply portion 102 includes an engine 316 for supplying energy to components of the supply portion 102, such as the pump 120, hot water generator 118, and various other components.

In various embodiments, the supply portion 102 includes a controller enclosure 210 as shown in FIG. 2. The controller enclosure 210 includes the system controller, which is in electrical communication with the various components of the supply portion 102 and the treatment portion 104. Through a treatment program, the controller controls the temperature and pressure of the water generated by the supply portion 102 and also the duration of the water spray in the treatment portion 104. In various treatment environments, the treatment temperature and treatment duration are controlled to treat the diseased tree without irreparably damaging or killing the tree.

In various embodiments, the controller is a Programmable Logic Controller (PLC) that includes programmable logic, which runs the treatment program. In various embodiments, the PLC may be programmed to receive a desired treatment duration, a desired treatment temperature, and a desired treatment pressure from the operator. In various embodiments, the PLC uses the treatment duration, treatment temperature, and treatment pressure to control the temperature and pressure of the water output by the supply portion 102 and the duration of fluid flow through the nozzles 806 of the treatment portion 104.

As described in greater detail below, the PLC is also in communication with a temperature transmitter 1502a (shown in FIG. 15), which is utilized to monitor the temperature of a tree within a canopy treatment region 1212. The temperature transmitter 1502a may be a temperature transmitter or element capable of sending a temperature signal to the PLC. The temperature transmitter 1502a may be in wired or wireless communication with the PLC. The temperature transmitter 1502a within the canopy treatment region 1212 during heat treatment may more accurately monitor the temperature within the canopy treatment region 1212 compared to temperatures monitored external to the canopy treatment region 1212. In various embodiments, the controller is in communication with a canopy valve 1902 (illustrated in FIG. 19) to selectively open and close the canopy valve 1902. Opening and closing the canopy valve 1902 thereby controls fluid flow from the supply portion 102 to the treatment portion 104 and through the nozzles 806 of the treatment portion 104. The PLC may be configured to close the canopy valve 1902 and thereby shut off the flow of fluid through the nozzles 806 when a desired treatment time at a desired temperature has been achieved. Communication with the PLC may be wired communication or wireless communication. In various other embodiments, the treatment program of water temperature and pressure and treatment duration is manually controlled. In various embodiments, the PLC also incorporates various interlocks such as tank level, flow, temperature, pressure, and various other interlocks to protect the pump 120, the hot water generator 118, various other equipment, and the treated tree or plants from potential damaging situations.

Figure 4:
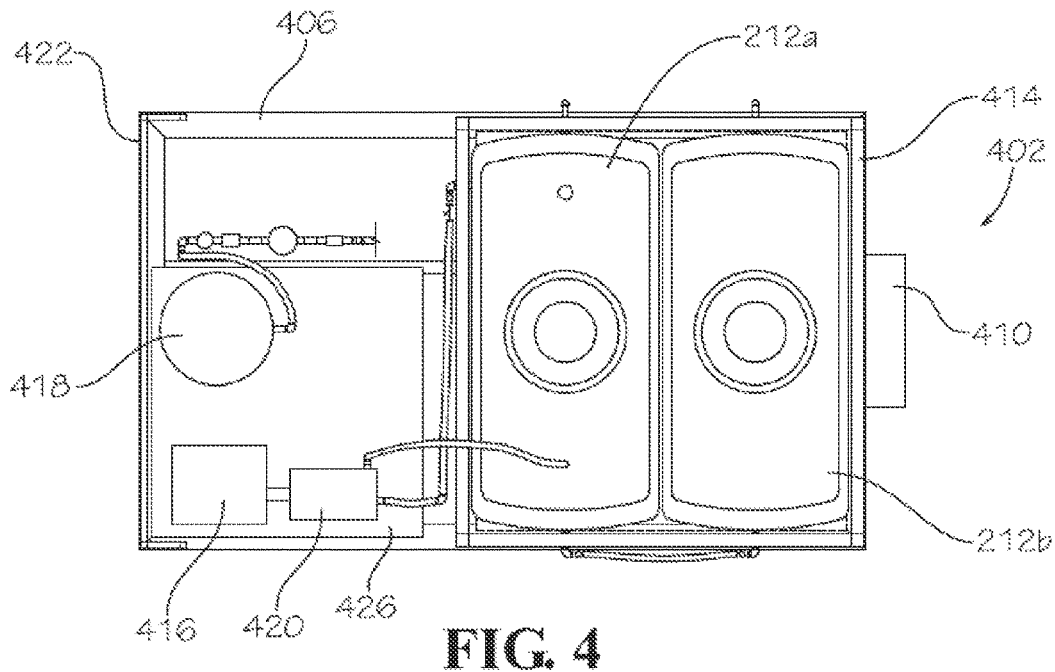
FIG. 4 is a top view of another embodiment of a supply portion.

FIGS. 4-7 show another embodiment of a supply portion 402. As shown in FIGS. 4-7, the supply portion 402 includes a hot water generator 418, which may be functionally similar to the hot water generator 118, and a pump 420, which may be functionally similar to the pump 120. In various embodiments, the supply portion 402 also includes: a base 406, which may be functionally similar to the base 106; a tank railing 414, which may be functionally similar to the tank railing 214; the controller enclosure 410, which may be functionally similar to controller enclosure 210; a steam generator skid 426, which may be functionally similar to the steam generator skid 302; and an engine 416, which may be functionally similar to the engine 316. As illustrated in FIG. 4, the supply portion 402 includes two water tanks 212a,b. The water tank 212a is a first water tank and the water tank 212b is a second water tank in fluid communication with the water tank 212a. The second water tank 212b increases the capacity of fluid stored on a base 406 in various embodiments.

In various embodiments, the base 406 also includes a generator railing 422. In various embodiments, the generator railing 422 provides protection for the components of the supply portion 402, such as the hot water generator 418 and the pump 420.

Figure 5:
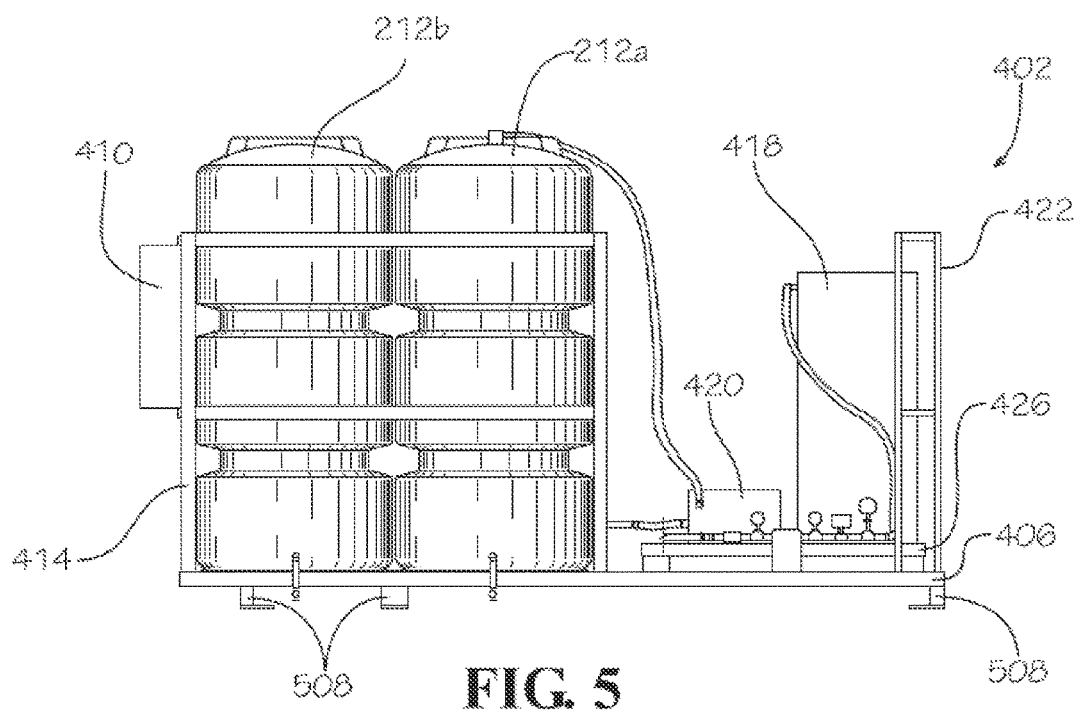
FIG. 5 is a side view of the supply portion of FIG. 4.
Figure 6:
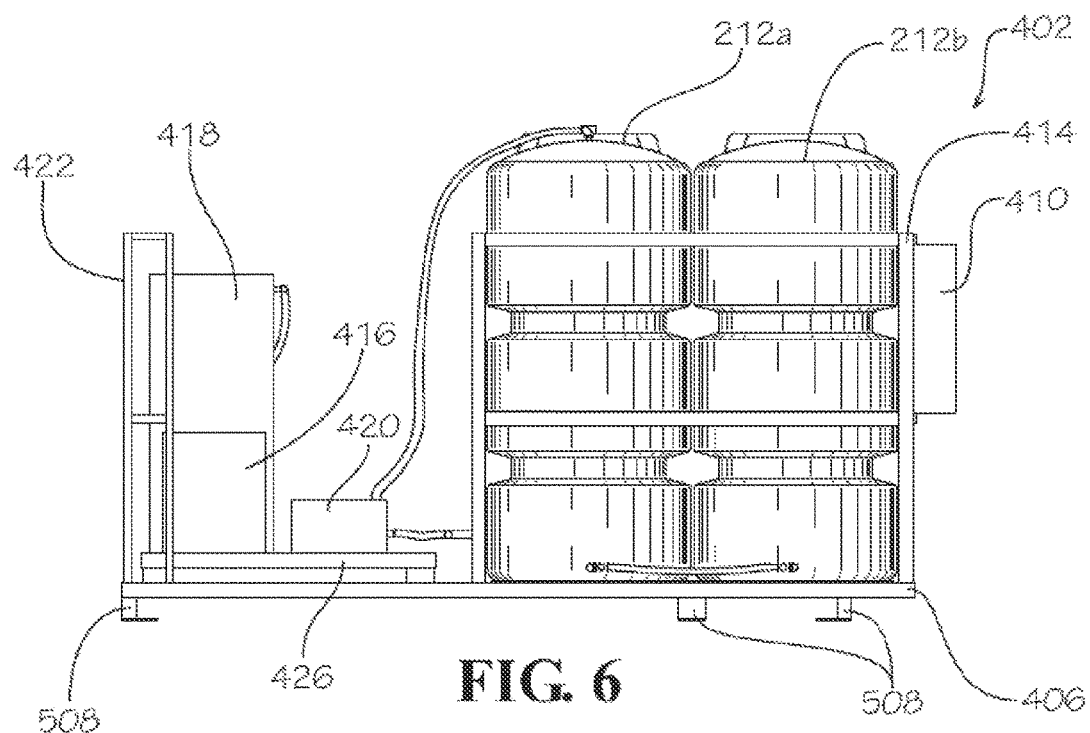
FIG. 6 is another side view of the supply portion of FIG. 4.
Figure 7:
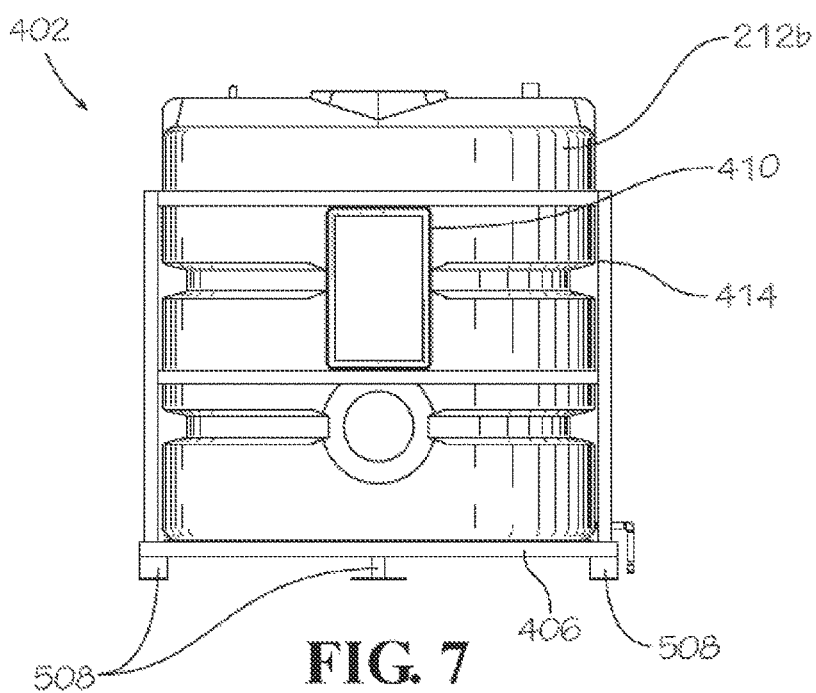
FIG. 7 is a front view of the supply portion of FIG. 4.
Figure 16:
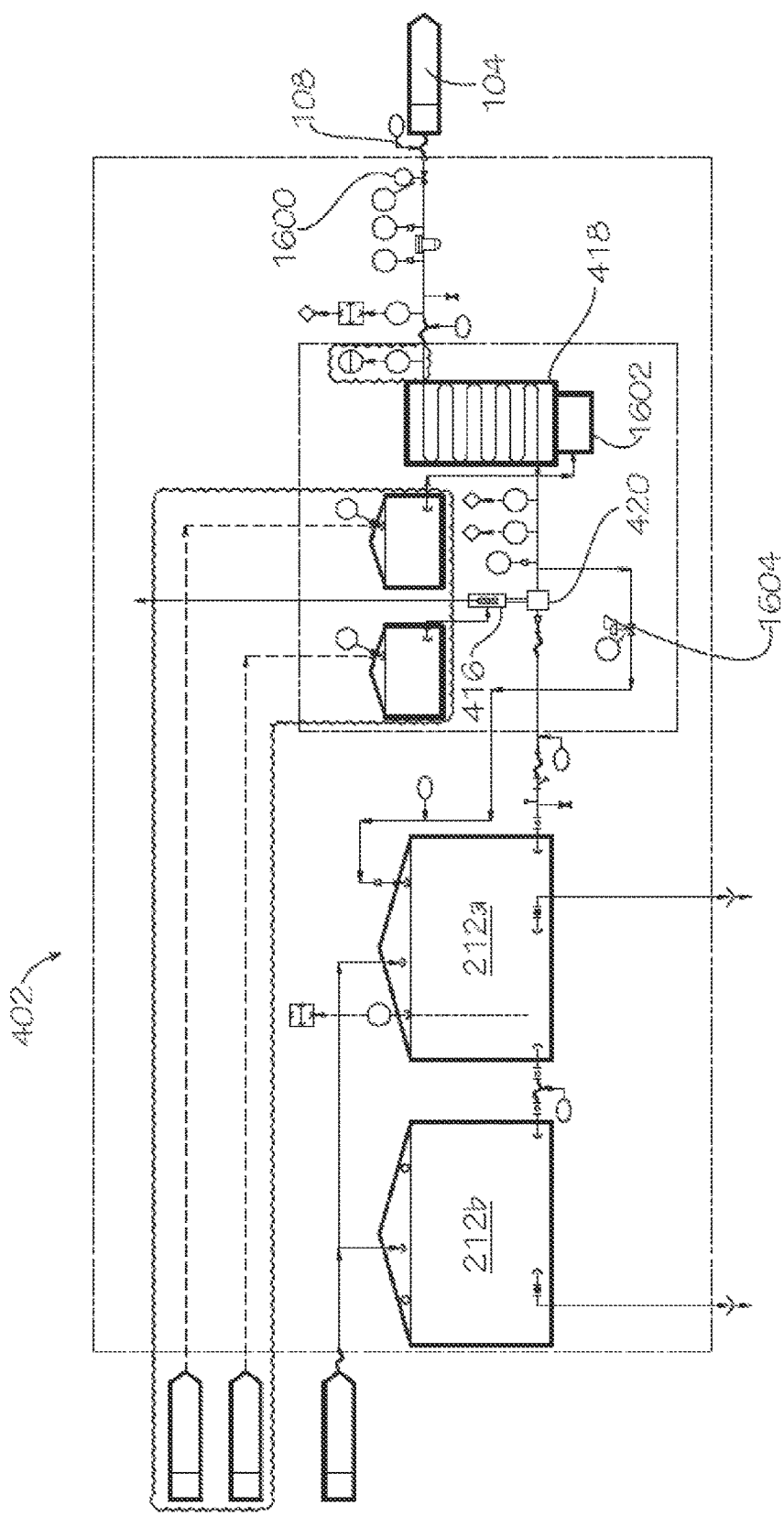
FIG. 16 is a detailed operational schematic of the supply portion of FIG. 4.

As shown in FIGS. 4-7, in various embodiments, the controller enclosure 410 is mounted on the tank railing 414. In various embodiments, the base 406 includes feet 508 as shown in FIGS. 5-7. In various embodiments, the feet 508 may be utilized to position and support the base 406 on the converted vehicle 114 shown in FIG. 1. Space between the base 406 and the converted vehicle 114 may be utilized to route various electrical components or piping components such as various hoses, tubing, or other components. A detailed schematic of the supply portion 402 is shown in FIG. 16, which is described in greater detail below.

Figure 9:
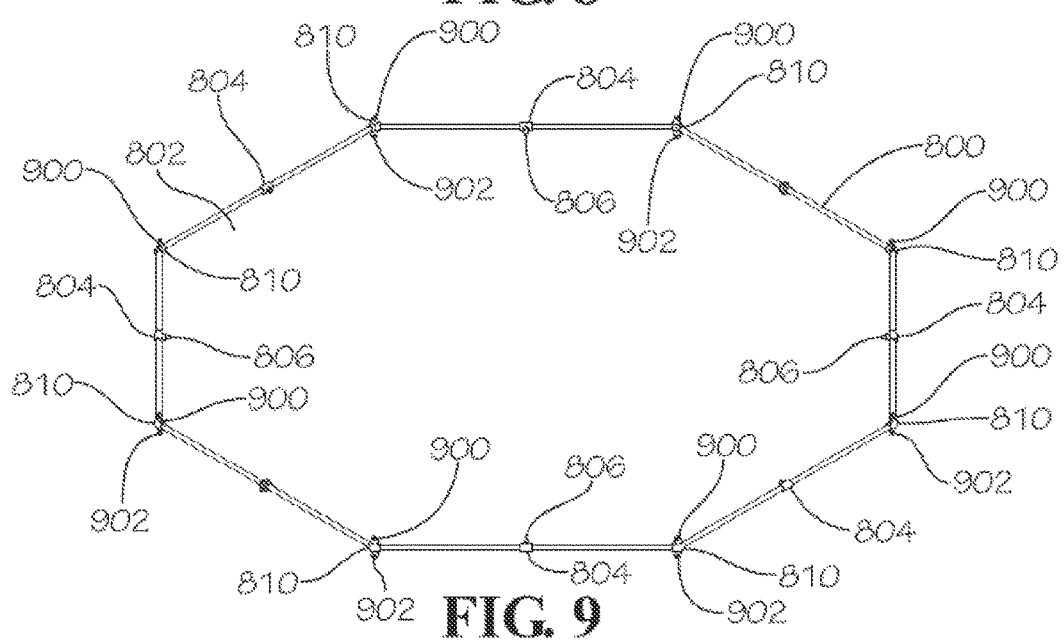
FIG. 9 is a perspective view of the treatment ring of FIG. 8.

In various embodiments, the treatment portion 104 includes at least one treatment ring 800 as shown in FIGS. 8 and 9. In various embodiments, the treatment ring 800 are an octagonal shape; however, the shape of the treatment ring 800 should not be considered limiting on the current disclosure as the treatment ring 800 may be any desired shape in various other embodiments. In various embodiments, the treatment ring 800 is constructed from a number of segments of piping; however, in various other embodiments, the treatment ring 800 may be a single continuous pipe. The disclosure of piping should not be considered limiting on the current disclosure as in various other embodiments, the treatment ring 800 is constructed from tubes, pipes, hoses, or various other similar components enabling fluid flow through the treatment ring 800. In various embodiments, the treatment ring 800 is constructed from various types of pressure piping. For example, in various embodiments the treatment ring 800 is constructed from pressure piping enabled to hold a fluid of a system that operates at about 110 psig. In various embodiments, the pressure at which the tree canopy treatment system operates may be less than the maximum pressure that the pressure piping may hold. The type of pressure piping used may be varied depending on particular application.

As shown in FIGS. 8 and 9, in various embodiments, the center area of the treatment ring 800 defines a treatment region 802. During treatment of a tree, the tree canopy treatment system 100 positions the treatment ring 800 such that the tree to be treated is within the treatment region 802. In various embodiments, the treatment ring 800 includes fluid connectors 804. The fluid connectors 804 may be a fitting, may be a threaded connector that connects with the piping of the treatment ring 800, may be welded to the piping of the treatment ring 800, or may be connected to the treatment ring 800 through various other suitable mechanisms. In various embodiments, the treatment ring 800 includes at least one spray nozzle 806 connected to at least one connector 804. In various embodiments, the spray nozzle 806 is orientated to direct fluid into the treatment region 802. In the present embodiments, each treatment ring 800 includes six connectors 804 and four spray nozzles 806; however, the number of fluid connectors 804 or the number of spray nozzles 806 should not be considered limiting on the current disclosure.

In various embodiments, the connectors 804 without spray nozzles 806 are either connected to the hosing 108, which is connected to the supply portion 102 as illustrated in FIG. 1, connected to hosing 1208a or 1208b (illustrated in FIG. 12), or the connectors 804 are plugged. In various embodiments, hosing 108 provides fluid communication between the treatment ring 800 and the supply portion 102 and the hosing 1208 provides fluid communication between multiple treatment rings 800 when the treatment portion 104 includes more than one treatment ring 800.

In various embodiments, the spray nozzle 806 may be selected from the group of nozzles including, but not limited to, full cone spray nozzles, hollow cone spray nozzles, fan spray nozzles, misting spray nozzles, air atomizing spray nozzles, special purpose spray nozzles, and various other types of spray nozzles. In various embodiments, a single treatment ring 800 may include at least two different types of spray nozzles 806. In various embodiments with more than one treatment ring 800, the spray nozzles 806 on one treatment ring 800 may be a different spray nozzle type from a spray nozzles 806 on another treatment ring 800. The configuration, number, or location of spray nozzles 806 or fluid connectors 804 on the treatment rings 800 should not be considered limiting on the current disclosure. In various embodiments, the number, location, or type of spray nozzles 806 may be varied depending on a particular use of the tree canopy treatment system 100. For example, in various embodiments, different spray nozzles 806 may be utilized to develop different spray patterns within the treatment region 802.

In the present embodiment, the spray nozzles 806 atomize the heated fluid from the supply portion 102 to create steam or mist. In various embodiments, the spray nozzles 806 are orientated such that fluid flow through the nozzles 806, such as steam, creates a vortex in the treatment region 802. Accordingly, the nozzles 806 circulate the steam around and through various portions of the tree for an even distribution of the fluid within the treatment region 802.

Figure 12:
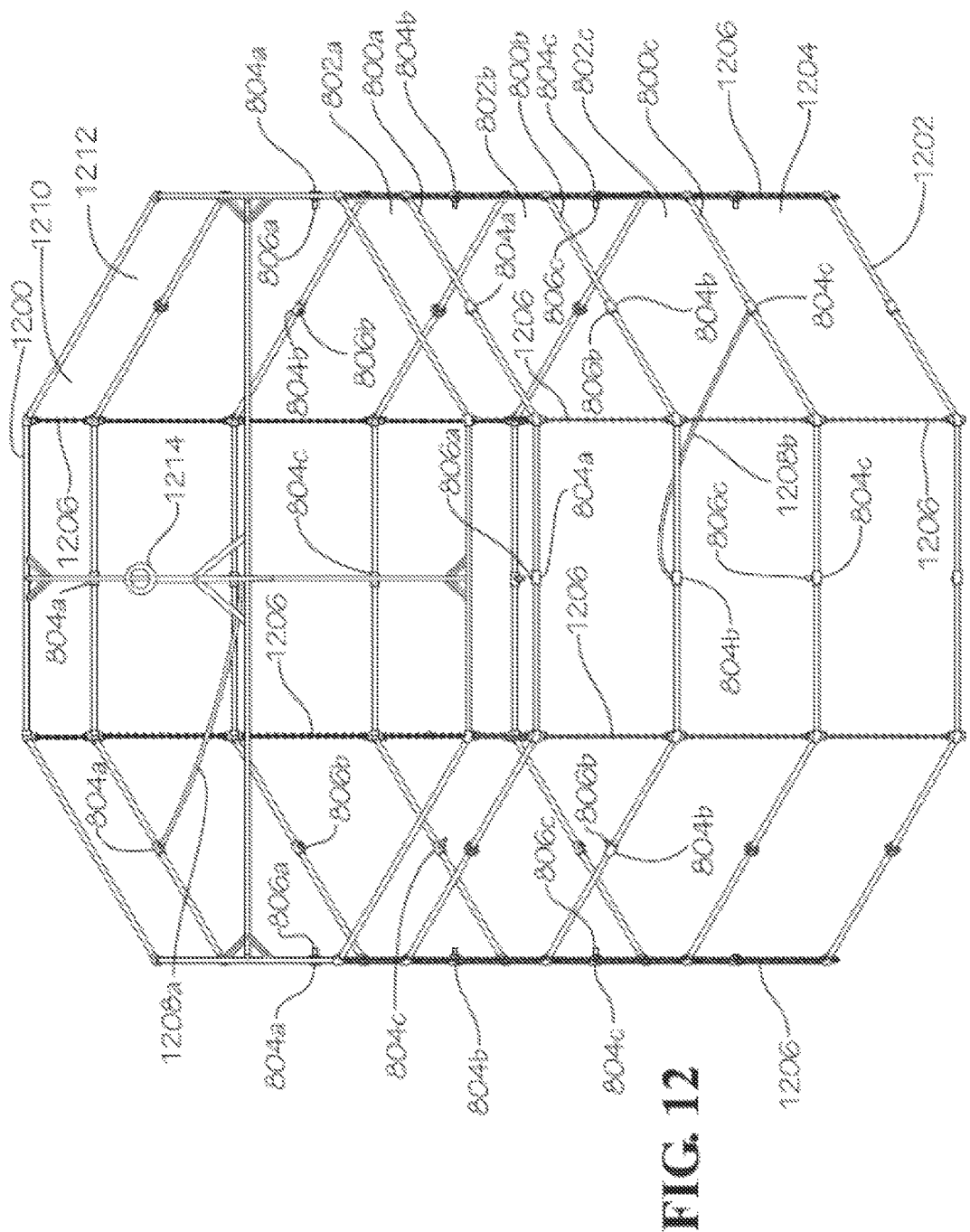
FIG. 12 is a perspective view of a support ring, a treatment ring, and a base ring of the treatment portion of FIG. 1.

As shown in FIGS. 8 and 9, in various embodiments, the treatment ring 800 includes vertical connectors 810. As shown in FIG. 9, in various embodiments, the vertical connectors 810 include a top connector 900 and a bottom connector 902. In various embodiments where the treatment portion 104 includes more than one treatment ring 800, as shown in FIG. 12 and described in greater detail below, the vertical connectors 810 provide mechanical connections enabling adjacent treatment rings 800 to be vertically connected. As described in greater detail below, in various embodiments, adjacent treatment rings 800 may be connected to each other through various support mechanisms.

Figure 10:
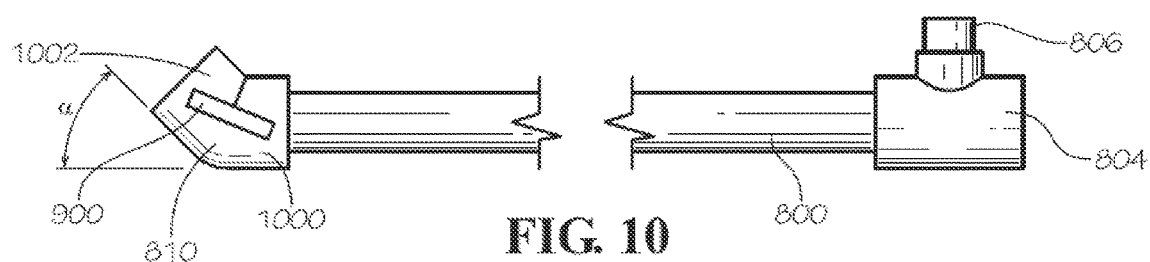
FIG. 10 is a detailed view of the treatment ring of FIG. 8 taken from detail 10 in FIG. 8.

FIG. 10 shows a portion of the treatment ring 800 taken from detail 10 in FIG. 8. As shown in FIG. 10, the vertical connector 810 includes a first portion 1000 and a second portion 1002 angled relative to the first portion 1000 at an angle α. In various embodiments, angle α may be any desired angle depending on the desired shape of the treatment ring 800. In various embodiments, the angle α may be 45° when the treatment ring 800 is the octagonal shape. FIG. 10 also shows the nozzle 806 connected to the fluid connector 804.

Figure 11:
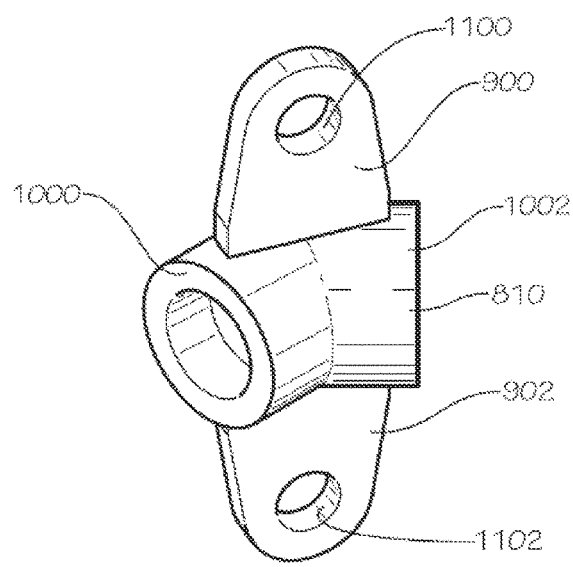
FIG. 11 is a perspective view of a vertical connector of the treatment ring of FIG. 8.

FIG. 11 is a perspective view of the vertical connector 810. As shown in FIG. 11, in various embodiments, the top connector 900 defines a top connecting bore 1100 as a connecting mechanism and the bottom connector 902 defines a bottom connecting bore 1102 as a connecting mechanism. The disclosure of connecting bores 1100,1102 should not be considered limiting on the current disclosure as in various other embodiments, the connection mechanism may be selected from the group of connecting mechanisms including, but not limited to, hooks, hooks and loops, buckles, clasps, pins, bolts, screws, and various other connecting mechanisms. In various embodiments, the connecting bores 1100,1102 may connect with the various vertical support mechanisms enabling vertical mechanical connection between adjacent treatment rings 800.

FIG. 12 shows the treatment portion 104 with the jib 110 and canopy 112 removed to show a plurality of treatment rings 800, a support ring 1200, and a base ring 1202. In the present embodiment, the treatment portion 104 includes three treatment rings 800a,b,c; however, the number of treatment rings 800 included with the treatment portion 104 should not be considered limiting on the current disclosure. As shown in FIG. 12, the treatment rings 800a,b,c of the treatment portion 104 are aligned such that the treatment regions 802a,b,c of each ring 800a,b,c, respectively, are offset. In various embodiments, the nozzles 806b of the treatment ring 800b are different from the nozzles 806a,c of the treatment rings 800a,c, respectively. In various embodiments, the nozzles 806b are cone nozzles and the nozzles 806a,c are fan nozzles. In various embodiments, the base ring 1202 defines a bottom opening 1204. In various embodiments, the aligned treatment regions 802 and bottom opening 1204 define a canopy treatment region 1212. In various embodiments, the tree to be treated is positioned in the canopy treatment region 1212 during treatment.

As shown in FIG. 12, in various embodiment the treatment portion 104 includes the inter-ring hosing 1208 between adjacent rings 800 such that rings 800a,b,c are in fluid communication with each other. In various embodiments, the inter-ring hosing 1208a,b is connected to connectors 804a,b,c, of each treatment ring 800a,b,c, respectively, that are without nozzles 806 and enables fluid communication between the multiple treatment rings 800a, b,c. As illustrated in FIG. 12, the hosing 1208a connects the treatment ring 800a with the treatment ring 800b such that the treatment rings 800a,b are in fluid communication, and the hosing 1208b connects the treatment ring 800b with the treatment ring 800c such that the treatment rings 800b,c are in fluid communication such that hosing 1208a and hosing 1208b connect to treatment ring 800b with fluid connector 804b located 180° apart. This provides even fluid pressure drop inside ring 800b. The disclosure of inter-ring hosing 1208 should not be considered limiting as in various other embodiments, the treatment rings 800 are in fluid communication with each other through piping, tubing, or any other suitable mechanism for fluid communication. In embodiments with a single treatment ring 800, the inter-ring hosing 1208 may be excluded from the treatment portion 104. In various embodiments, one of the plurality of treatment rings 800a,b,c, such as the treatment ring 800a, is connected to the hosing 108 (not shown in FIG. 12). In various embodiments, the hosing 108 is connected to one of the fluid connectors 804a without a nozzle 806a and that is on opposite side of 800a where hosing 1208a is connected. In various embodiments, the hosing 108 enables fluid communication between the treatment rings 800 and the supply portion 102 such that the hot and pressurized fluid generated by the supply portion 102 is transported to the treatment rings 800.

As shown in FIG. 12, in various embodiments, in addition to the treatment rings 800, the treatment portion 104 includes the support ring 1200 and the base ring 1202. The number, location, or shape of any of the treatment ring 800, support ring 1200, or base ring 1202 should not be considered limiting on the current disclosure as in various embodiments, the treatment rings 800, support ring 1200, or base ring 1202 may have any desired shape, number, or location.

In various embodiments, the treatment rings 800, support ring 1200, and base ring 1202 are connected to each other through support mechanisms 1206. In various embodiments, the support mechanisms 1206 may be various support mechanisms including, but not limited to, ropes, cables, chains, rods, beams, and various other support mechanisms enabling mechanical connectivity between the various rings 800,1200,1202 of the treatment portion 104. In various embodiments, the support mechanisms 1206 are collapsible or extendable such that a distance between adjacent rings may be varied. Various collapsible or extendable support mechanisms 1206 include, but are not limited to, telescoping rods, telescoping beams, ropes, cables, chains, and various other similar support mechanisms.

The height of the treatment portion 104 is defined as a distance from the top ring of the treatment portion 104, such as the support ring 1200, to the bottom ring of the treatment portion 104, such as the base ring 1202. In various other embodiments, the top ring may be one treatment ring 800 or the bottom ring may be one treatment ring 800. In various embodiments utilizing collapsible or extendable support mechanisms 1206, the height of the treatment portion 104 may be varied between an extended height (shown in FIG. 15) and a collapsed height (shown in FIG. 13). In various embodiments, the height of the treatment portion 104 in the extended height is greater than the height of the treatment portion 104 in the collapsed height. In various other embodiments, the support mechanisms 1206 are rigid such that a distance between adjacent rings may not be varied. Various rigid support mechanisms 1206 include non-telescoping rods, beams, and various other similar support mechanisms. In the present embodiment, the support mechanisms 1206 are chains.

In various embodiments, the support ring 1200 includes a support connector 1214 that may connect to the jib 110. In various embodiments, the jib 110 is connected to the support connector 1214 through a connection mechanism (not shown) such as hooks, shackles, hooks and loops, buckles, clasps, pins, bolts, screws, and various other similar connection mechanisms.

As shown in FIG. 12, in various embodiments, the support ring 1200 defines a top opening 1210 in a center portion of the support ring 1200. In various embodiments, the base ring 1202 is a weighted ring. In various embodiments, the base ring 1202 is identical to the treatment rings 800 but is without any spray nozzles 806 or connecting hoses 1208. In various embodiments where the support mechanisms 1206 are collapsible or extendable, the base ring 1202 may aid in varying the height of the treatment portion 104 between the collapsed height and the extended height. In various embodiments, the treatment portion 104 may be in the collapsed state to allow for easier transport.

In various embodiments, the canopy 112 shown in FIG. 1 is draped around and surrounds the treatment rings 800, the support ring 1200, and the base ring 1202. In various embodiments, the canopy 112 also covers the top opening 1210 of the support ring 1200. The canopy 112 is utilized to contain moisture and heat within the canopy treatment region 1212 of the treatment portion 104.

Figure 13:
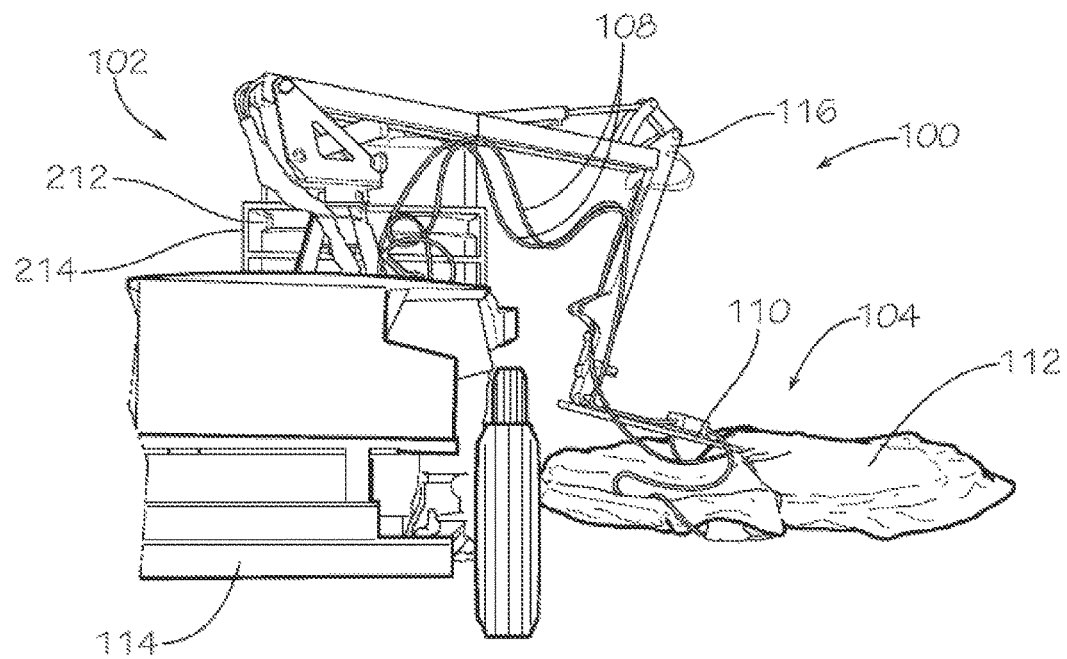
FIG. 13 is a perspective view of the tree canopy treatment system of FIG. 1 with the treatment portion at a collapsed height.
Figure 14:
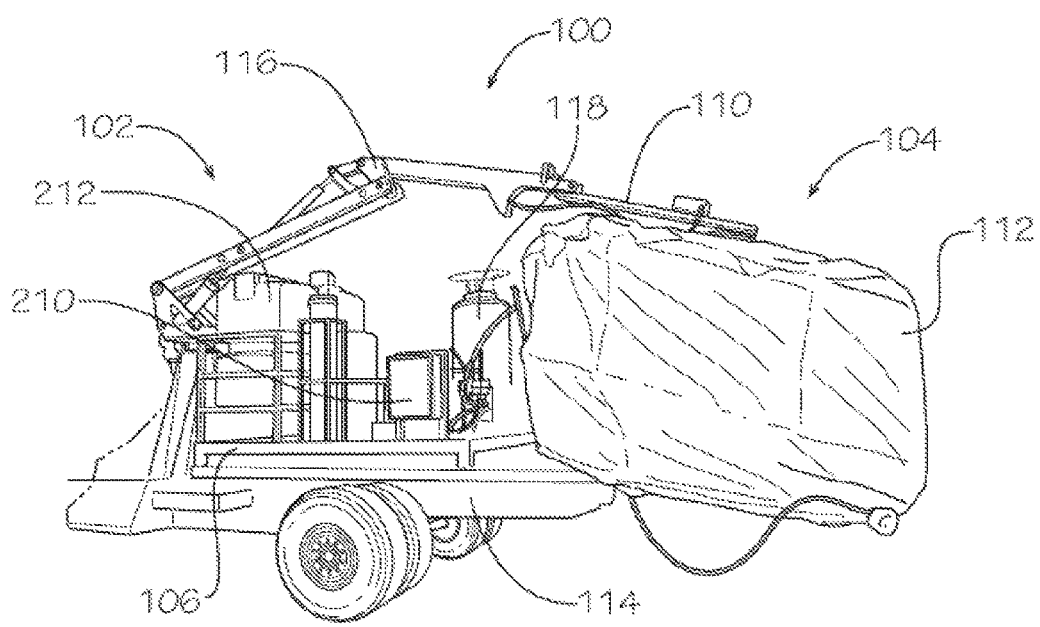
FIG. 14 is a perspective view of the tree canopy treatment system of FIG. 1 with the treatment portion at a partially collapsed height.
Figure 15:
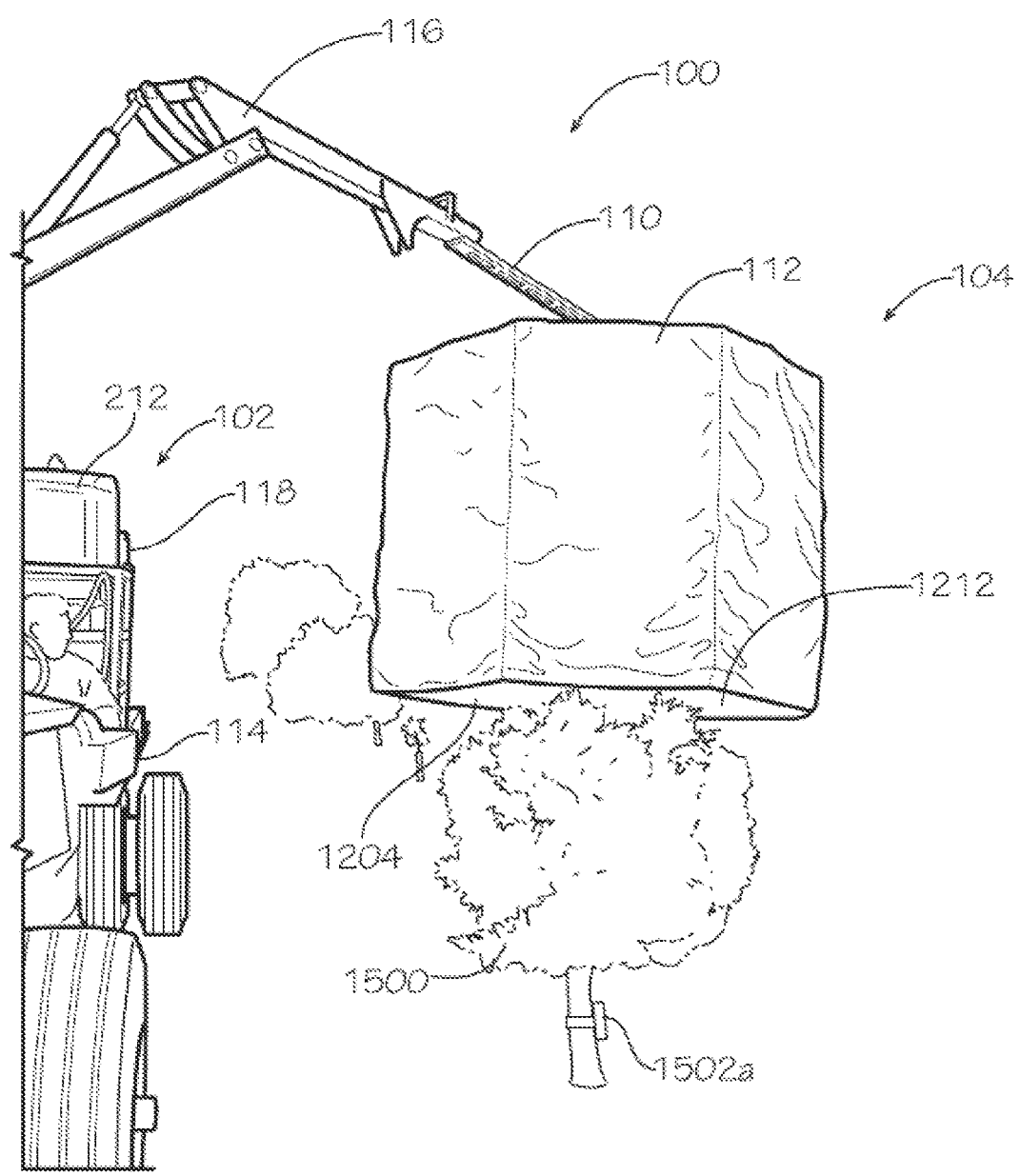
FIG. 15 is a perspective view of the treatment canopy treatment system of FIG. 1 with the treatment portion at an extended height and being positioned around a tree.

FIG. 13 shows the tree canopy treatment system 100 with treatment portion 104 at the collapsed height. FIG. 14 shows the tree canopy treatment system 100 with the treatment portion 104 at a partially collapsed height between the collapsed height and the extended height. FIG. 15 shows the tree canopy treatment system 100 with the treatment portion 104 at the extended height. In various embodiments, the treatment portion 104 is at the extended height while the elevating mechanism 116 raises and lowers the treatment portion 104 around the tree to be treated, as illustrated in FIG. 15.

FIG. 15 shows the treatment portion 104 at the extended height. As shown in FIG. 15, the canopy 112 is draped around and surrounds the treatment rings 800. As shown in FIG. 15, in various embodiments, the base opening 1204 of the base ring 1202 is positioned over a tree 1500 to be treated before the treatment portion 104 is positioned around the tree 1500. To treat the tree 1500, the treatment portion 104 may be lowered over the tree 1500 such that the tree 1500 is positioned in the canopy treatment region 1212 defined by the treatment rings 800. In various embodiments, the treatment portion 104 is positioned around the tree 1500 with the base ring 1202 positioned on the ground. As shown in FIG. 15, in various embodiments, the temperature transmitter 1502*a* is positioned such that it will be within the canopy treatment region 1212. The temperature transmitter 1502*a* may be attached to the tree 1500. In various other embodiments, the temperature transmitter is configured to monitor the temperature of the tree 1500 during treatment. In various embodiments, the temperature transmitter 1502*a* is in wired communication or wireless communication with the PLC.

FIG. 16 shows a schematic of the supply portion 402 with additional equipment. As previously described, the supply portion 402 includes the hot water generator 418 and the pump 420. As illustrated in FIG. 16, the supply portion 402 includes the water tanks 212*a,b*. The pump 420 pumps water from the tanks 212*a,b* to the hot water generator 418. In various embodiments, a burner 1602 is utilized to provide heat into the water flowing through the hot water generator 418; however, the disclosure of the burner 1602 should not be considered limiting on the current disclosure. In various embodiments, the burner 1602 may utilize a fuel source, for example diesel fuel, to generate the necessary heat.

The supply portion 402 includes a recirculation valve 1604 positioned between the pump 420 and the hot water generator 418. Heated water may exit the hot water generator 418. Together, the pump 420 and hot water generator 418 pressurize the water from the tanks 212*a,b* and heat the water under pressure. In various embodiments, a canopy valve 1600 is utilized to control the flow of the pressurized hot water from the hot water generator 418. In various embodiments, the pressurized hot water is recirculated via the recirculation valve 1604 from the supply portion 402 to the tanks 212*a,b* until the canopy valve 1600 is opened.

In various embodiments, the canopy valve 1600 is in communication with the PLC. In various embodiments, the PLC is in communication with a user device, such as a laptop or other electronic device, running a treatment program. In various embodiments, the operator may select a start button of the treatment program on the user device, which causes the PLC to communicate with the canopy valve 1600 to permit fluid flow from the supply portion 402 to the treatment portion 104. In various embodiments, the operator selects the start button after the treatment portion 104 is positioned over a tree to be treated and a temperature transmitter, such as temperature transmitter 1502*a*, is positioned near the center of the tree 1500.

In various embodiments, the hot water generator 418 is automatically controlled through the PLC to maintain a desired outlet water temperature. The flow of water to the treatment portion 104 is automatically controlled in various embodiments, to maintain a desired temperature in the treatment region 1212 containing the tree, as measured by the temperature transmitter 1502*a* positioned in the treatment region 1212. In various embodiments, the PLC is in communication with the canopy valve 1600 and may be configured to open and shut the canopy valve 1600 to maintain a desired temperature within the treatment region 1212. The canopy valve 1600 may be closed to prevent fluid flow when a desired treatment time at a desired temperature has been achieved.

Figure 17:
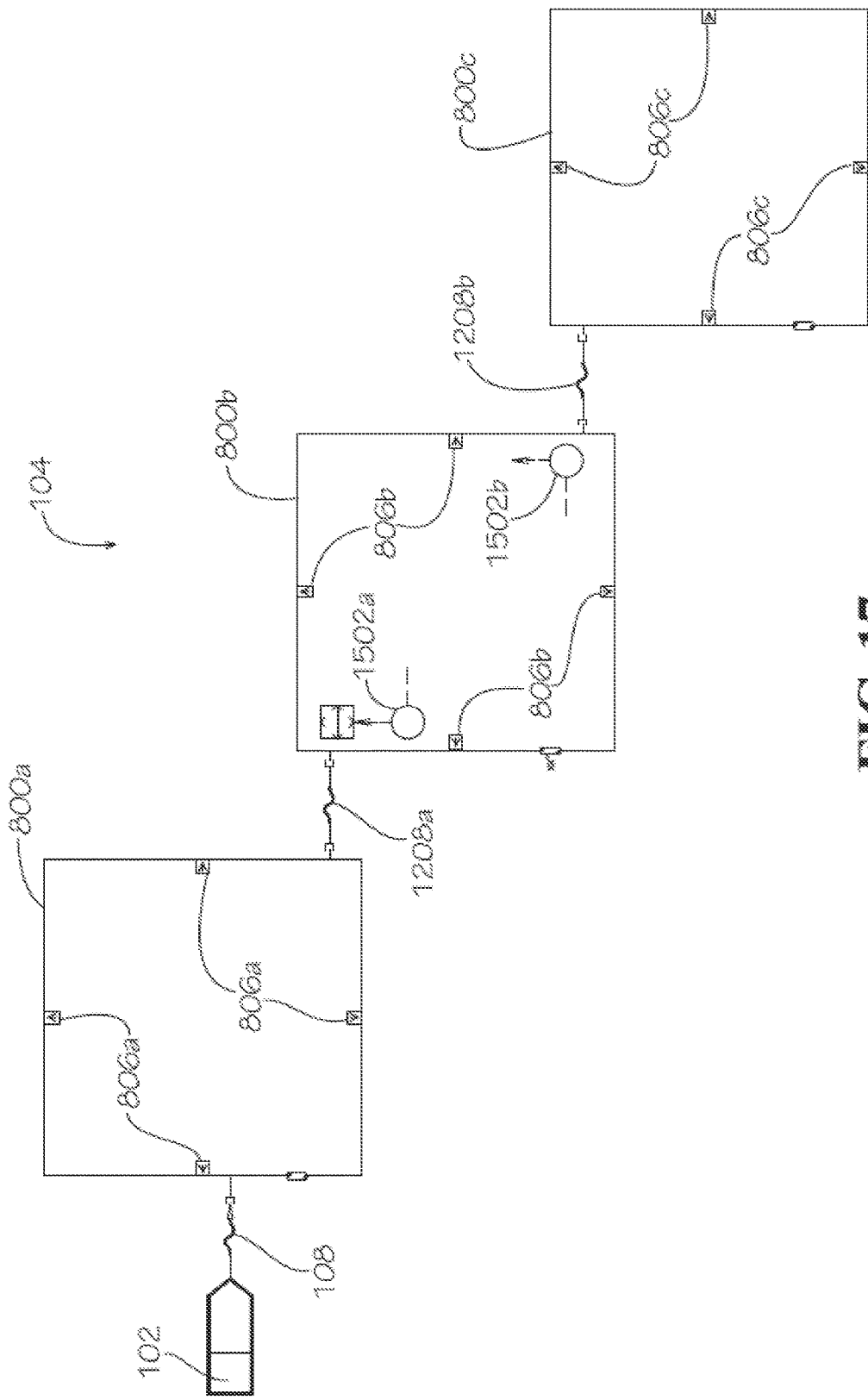
FIG. 17 is an operational schematic of the treatment portion of FIG. 1.

FIG. 17 shows a schematic the treatment portion 104. When the canopy valve 1902 of the supply portion 102 (or canopy valve 1600 of the supply portion 402) is opened, hot water from the supply portion 102 flows through the hosing 108 to the treatment portion 104, which includes the canopy 112 and the treatment rings 800*a,b,c* having the nozzles 806*a,b,c*, respectively. In various embodiments, the treatment portion 104 is lowered around the tree to be treated until the base ring 1202 rests on the ground surface. The treatment portion 104 sprays the hot water through nozzles 806. The nozzles 806 may evenly spray the water on the tree to thoroughly distribute the heat.

While the tree is being treated, the user may place the second temperature transmitter 1502b on the next tree to be treated. The number of temperature transmitters 1502 should not be considered limiting on the current disclosure. In various embodiments, after the heat treatment of the tree is finished, the treatment portion 104 is raised and the tree canopy treatment system 100 is relocated to the next tree where the process starts again.

In various embodiments, the temperature transmitters 1502 transmit a temperature signal to the PLC to communicate the detected temperature to the PLC. In various embodiments, the PLC is programmable to control the ambient temperature within the treatment portion 104, treatment duration with water in the treatment portion 104, and various other aspects of the process that the user may want to control. For example, in various embodiments, the user may control flow rate or pressure within the tree canopy treatment system 100.

In various embodiments, the canopy treatment region 1212 may be heated to a temperature that is sufficient to reduce and/or prevent disease infection in a plant. For example, in various embodiments, the temperature may be maintained at a range from 121° F. to 135° F., such as from 121° F. to 131° F. In various embodiments, the temperature may be maintained at about 126° F. In various other embodiments, the temperature may be outside of the range of 121° F. to 135° F., as the treatment temperature may depend on treatment duration and ambient conditions. In various embodiments, the treatment duration may be any predetermined duration of time that the plant is positioned in the canopy treatment region 1212. In various embodiments, any desired combination of treatment duration and treatment temperature may be utilized to heat the temperature of a plant to a predetermined temperature. In various embodiments, the spray continues until a desired temperature is maintained at an adjustable temperature level for an adjustable time period.

Figure 18:
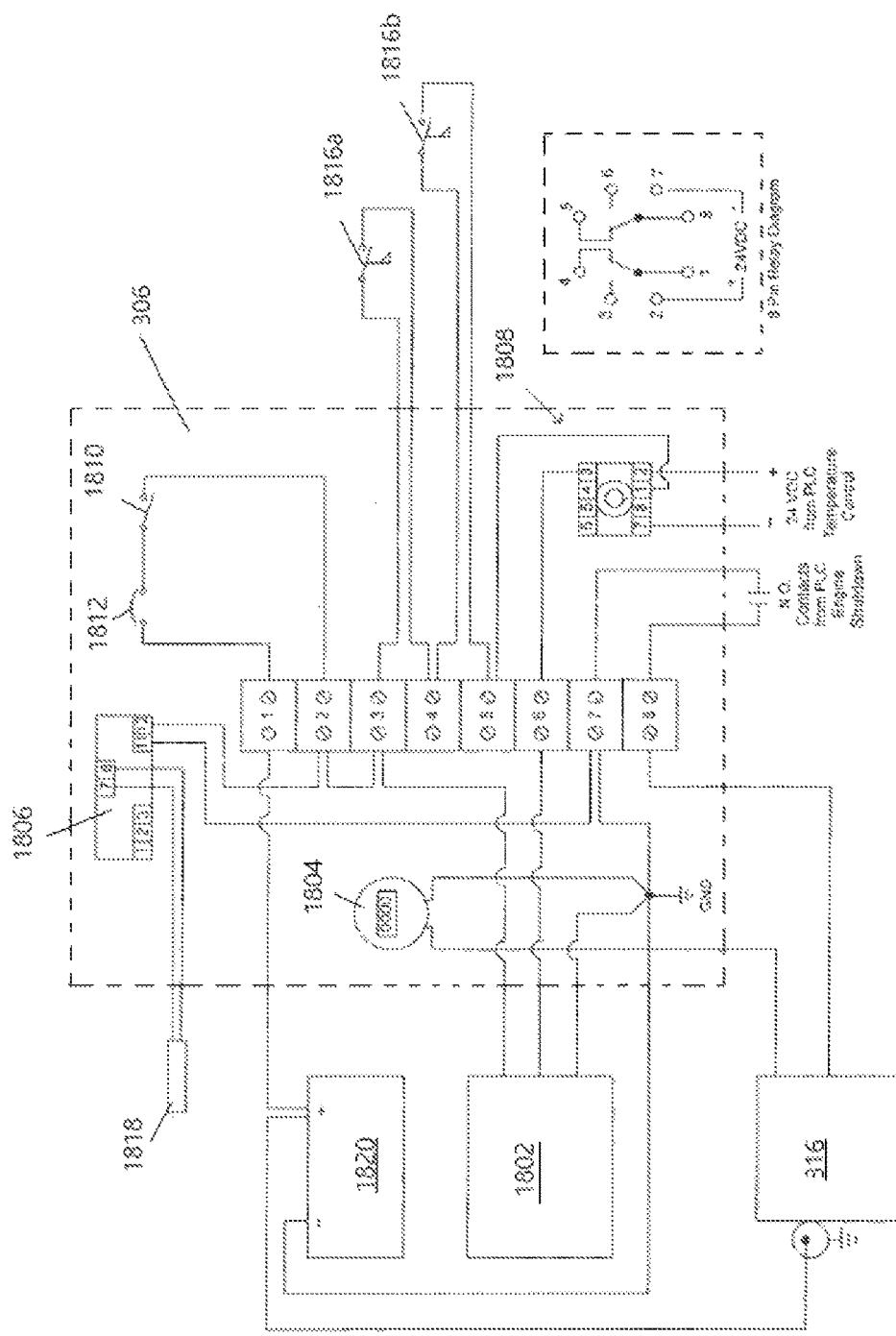
FIG. 18 is an electrical schematic for the tree canopy treatment system of FIG. 1.

FIG. 18 shows an electrical schematic of the tree canopy treatment system 100. In various embodiments, when a treatment cycle is initiated through the PLC, the canopy valve 1902 is opened and flow is allowed to pass to the nozzles 806 of the treatment portion 104. The flowing water may activate flow switches 1816a,b and allow the burner 1802 to heat the water in the hot water generator 118. In various embodiments, a burner switch 1810 must be turned "on" before the burner 1802 is allowed to fire. In addition, in various embodiments, the canopy valve 1902 is open and allowing water flow to the treatment portion 104 for the burner 1802 to turn on. In various embodiments, the low flow switches 1816a,b monitor the flow of water between the pump 120 and the hot water generator 118. In various embodiments, if flow is lost, the burner 1802 will shut off. The number of low flow switches 1816 should not be considered limiting on the current disclosure. In various embodiments, after water heats the temperature within the canopy treatment region 1212 to a desired temperature level and a treatment duration has expired, the canopy valve 1902 will shut and the burner 1802 will cease firing due to the loss of flow across the flow switches 1816. The water flow will then recirculate to the tanks 212a,b through the recirculation valve 1900.

In various embodiments, the conditions that may be satisfied for the burner 1802 to operate includes the PLC is turned on and optionally in communication with the user device, the engine 316 is running, which in turn operates the pump 420, the burner switch 1810 is turned to an "on" position, and the water level in the tank 212 is above a setpoint. In various embodiments, if water levels in the tank 212 is too low, a low level trip is activated, which may prevent the burner 1802 from operating until the water tanks are refilled.

As illustrated in FIG. 18, the burner control wiring enclosure 306 includes a temperature display 1806 in electrical communication with a temperature probe 1818 in various embodiments. The burner control wiring enclosure 306 also includes an hour meter 1804 in various embodiments that is in electrical communication with the engine 316. A battery 1820 is in electrical communication with the engine 316. The burner control wiring enclosure 306 includes a temperature control relay 1808 in communication with the PLC in various embodiments. The burner control wiring enclosure 306 also includes a circuit breaker 1812 in various embodiments.

Figure 19:
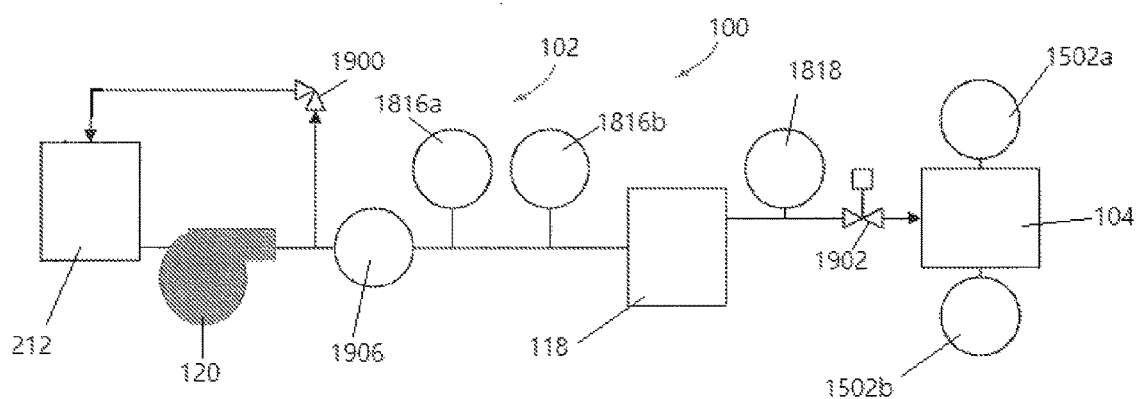
FIG. 19 is a diagram showing the flow path of water through the tree canopy treatment system of FIG. 1.
Figure 22:
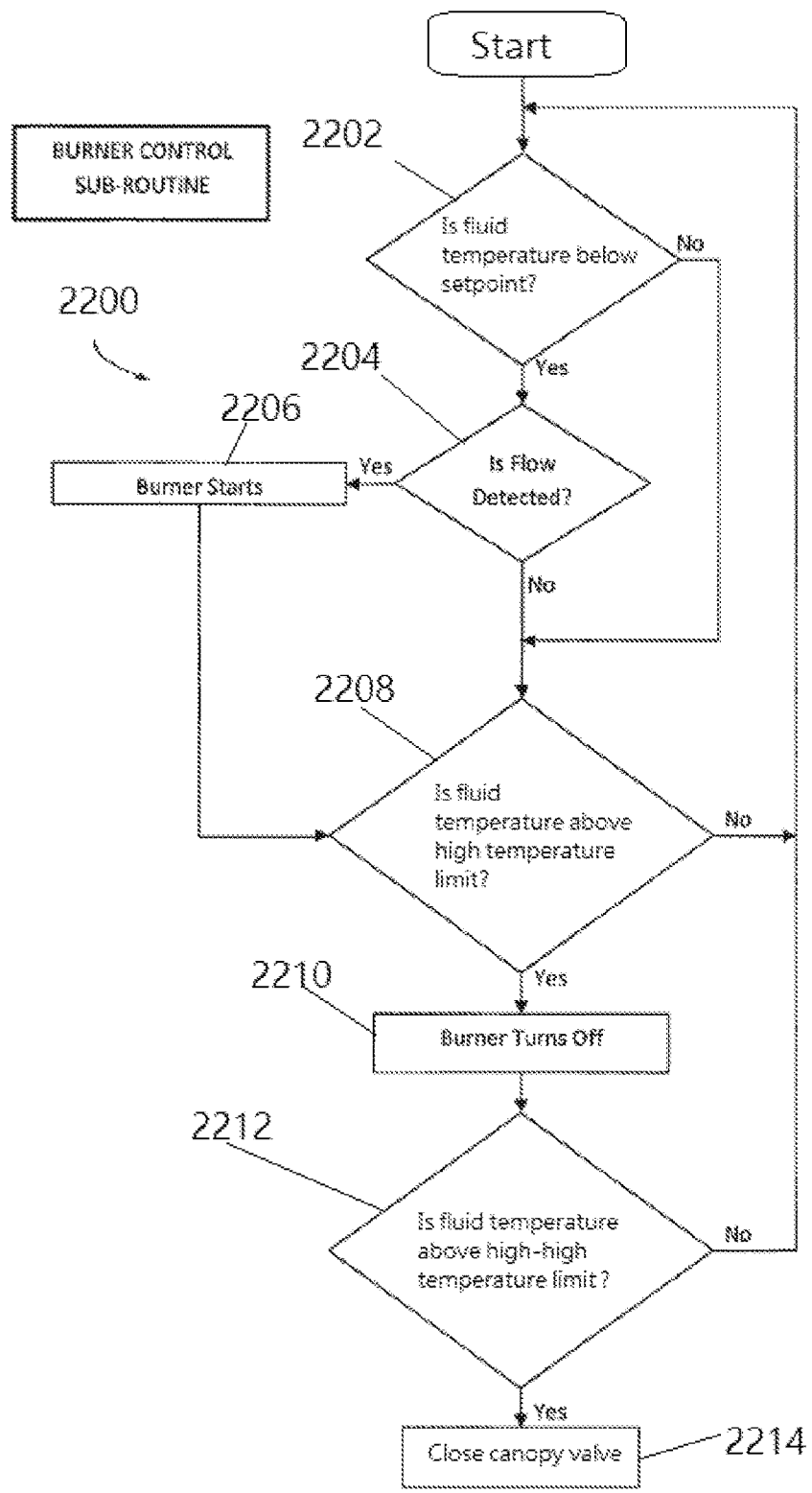
FIG. 22 is a flow chart of a sub-routine of the main routine of FIG. 20 for controlling a fluid temperature.

FIG. 19 is a diagram showing the flow path of water through the tree canopy treatment system 100. Water may be held in the water tank 212. The pump 120 pulls water from the water tank 212 and pumps it to the hot water generator 118. The water may flow through the flow switches 1816a,b. The water is heated in the hot water generator 118 and exits the hot water generator 118 to flow to the canopy valve 1902. The water may flow past an outlet temperature transmitter 1904, which detects the temperature of the water exiting the hot water generator 118. The temperature detected by the outlet temperature transmitter 1904 may be utilized by a burner control sub-routine, which is illustrated in FIG. 22. When the canopy valve 1902 is open, the hot water flows to the treatment portion 104 to treat the tree. One of the temperature transmitters 1502a,b monitors the temperature of the atmosphere created by the hot water in the canopy 112. In various embodiments, when the canopy valve 1902 is closed, water exiting the pump 120 is recirculated to the water tank 212 through the recirculation valve 1900.

Figure 20:
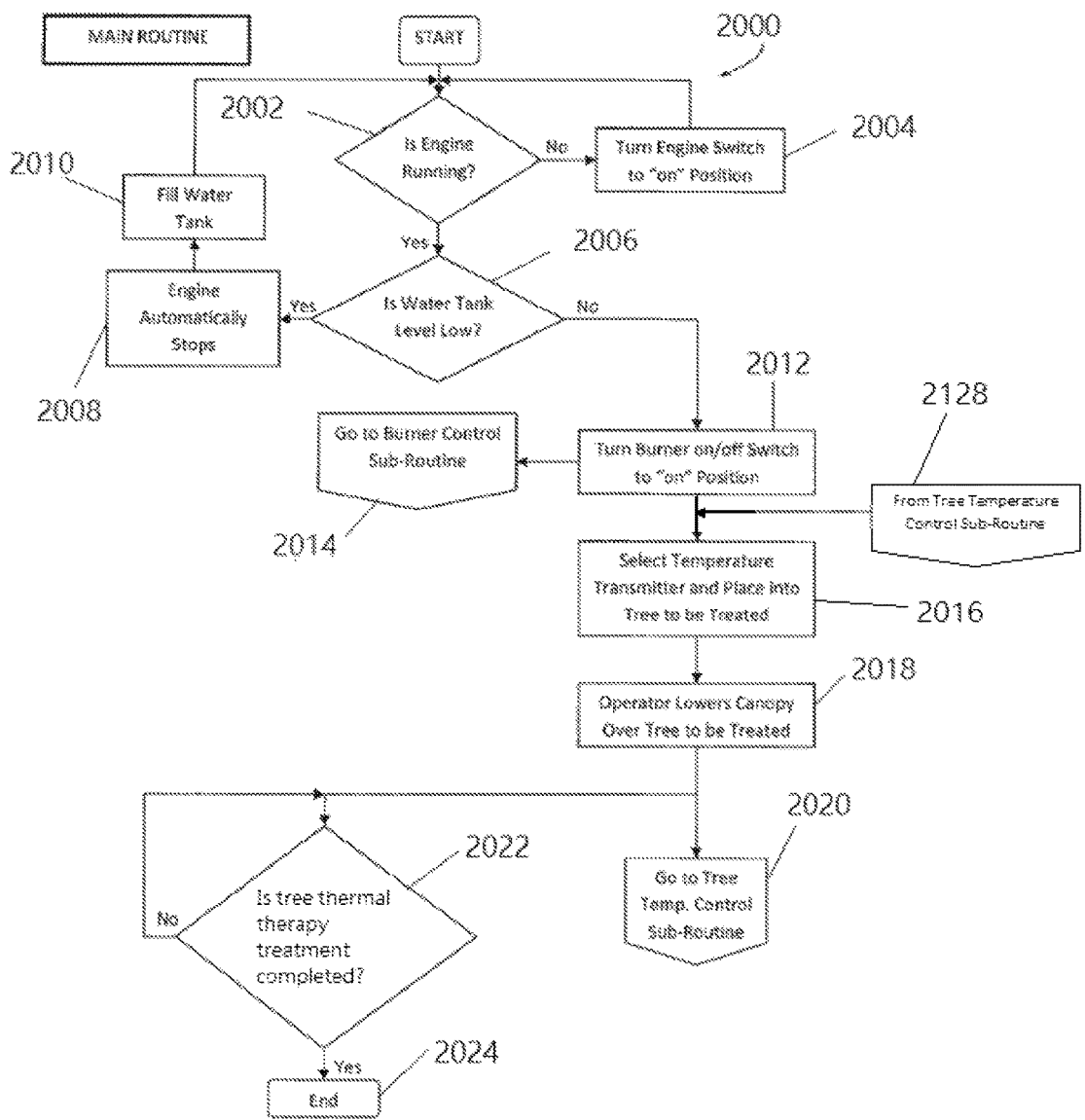
FIG. 20 is a flow chart of a main routine of treating a tree with the tree canopy treatment system of FIG. 1.

FIG. 20 is a flow chart of an embodiment of a main routine 2000 for treating a tree with the tree canopy treatment system 100. As illustrated in FIG. 20, after starting the routine 2000, the operator determines whether the engine 316 is running in step 2002. If the engine 316 is not running, in step 2004, the operator turns an engine switch to an "on" position. If the engine 316 is running, in step 2006, the PLC determines whether the water tank level in the water tank 212 is low. If the water tank level is low, the routine 2000 proceeds to step 2008, where the engine automatically stops, and then to step 2010, where the operator fills the water tank 212, before returning to step 2002.

Figure 21:
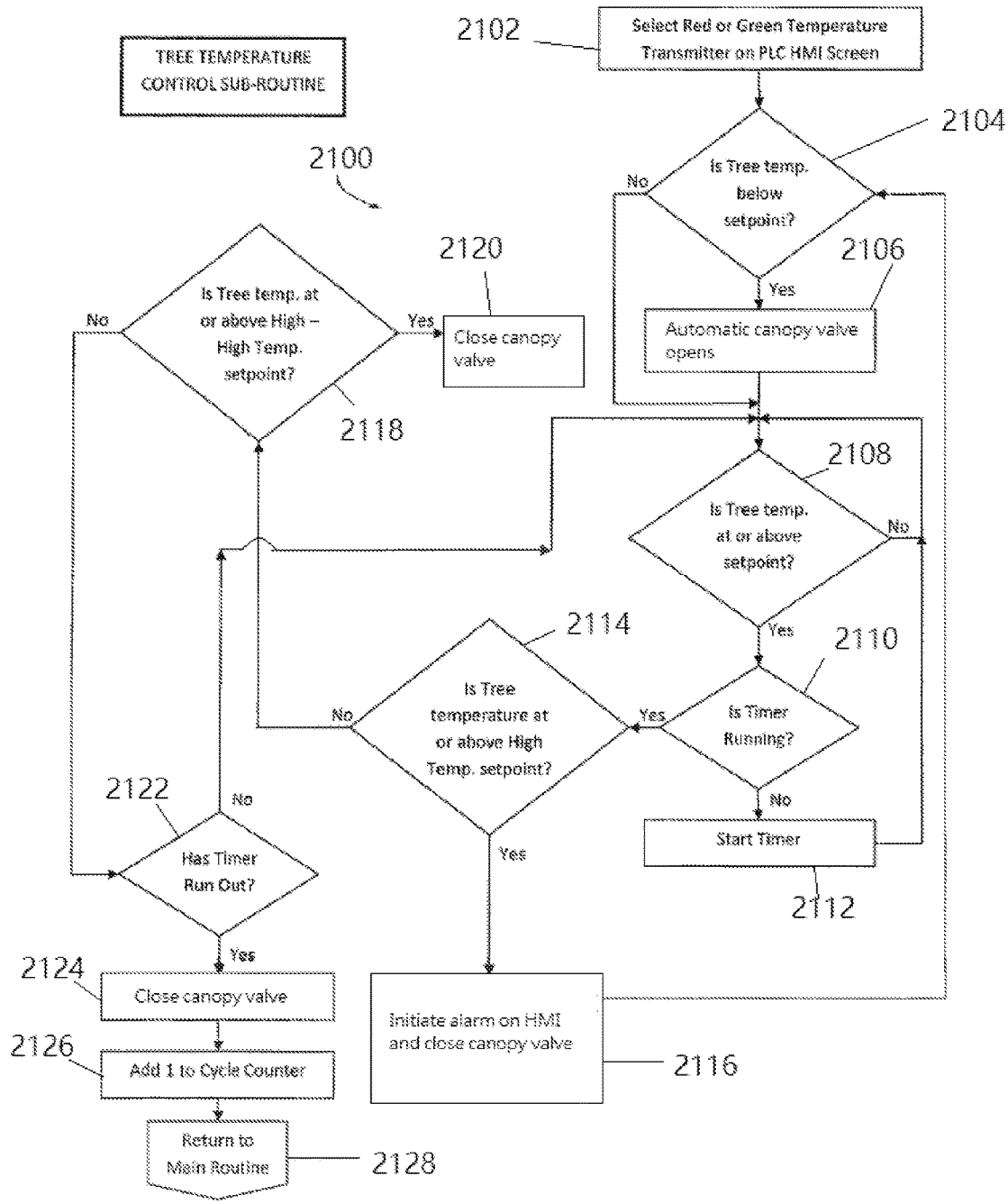
FIG. 21 is a flow chart of a sub-routine of the main routine of FIG. 20 for controlling tree temperature.

If the water tank level is not low in step 2006, the routine 2000 proceeds to step 2012, where the operator turns the burner switch 1810 to the "on" position. In step 2014, the routine starts the burner control sub-routine, which is illustrated in FIG. 22. In step 2016, the operator selects a temperature transmitter 1502 and places it into the tree to be treated. A tree temperature control sub-routine, which is described in greater detail with reference to FIG. 21, returns to the main routine 2000 in step 2128 between step 2012 and step 2016. In step 2018, the operator lowers the treatment portion 104 including the canopy 112 over the tree to be treated. In step 2020, the routine 2000 goes to the tree temperature control sub-routine, which is illustrated in FIG. 21. In step 2022, the PLC determines whether the tree thermal therapy treatment is completed. The PLC continues this determination until the tree thermal therapy treatment has ended, and then the routine 2000 proceeds to step 2024 where the routine 2000 ends.

FIG. 21 illustrates a flow chart of the tree temperature control sub-routine according to various embodiments of the present disclosure. As illustrated in FIG. 21, in step 2102, the operator selects a red or green temperature transmitter on a PLC Human Machine Interface (HMI) screen. The temperature transmitter selected on the HMI screen corresponds with the temperature transmitter 1502 selected by the operator in step 2016. In step 2104, the PLC determines whether the tree temperature is below a setpoint temperature. If the tree temperature is not below the setpoint temperature, the routine 2100 skips to step 2108, which is described below. If the tree is below the setpoint temperature, the routine 2100 proceeds to step 2106 where the automatic canopy valve 1902 opens. In step 2108, the PLC determines whether the tree temperature is at or above the setpoint temperature. If the tree temperature is not at or above the setpoint temperature, the routine 2100 continues to loop back to step 2108 until the tree temperature is at or above the setpoint temperature.

If the tree is at or above the setpoint temperature, in step 2110, the PLC determines whether a timer is running. If the timer is not running, in step 2112, the PLC starts the timer, and then returns to step 2108. If the timer is running in step 2110, in step 2114, the PLC determines whether the tree temperature is at or above a high temperature setpoint. If the tree is at or above the high temperature setpoint, in step 2116, the PLC initiates an alarm on the HMI screen and closes the canopy valve 1902. If the tree temperature is not at or above the high temperature setpoint, in step 2118, the PLC determines whether the tree temperature is at or above a high-high temperature setpoint. If the tree temperature is at or above the high-high temperature setpoint, in step 2120, the PLC closes the canopy valve 1902.

If the tree temperature is not at or above the high-high temperature setpoint, in step 2122, the PLC determines whether the timer has run out. If the timer has not run out, the routine 2100 returns to step 2108. If the timer has run out in step 2122, in step 2124, the PLC closes the canopy valve 1902. In step 2126, the PLC adds 1 to a cycle counter before returning to the main routine in step 2128.

FIG. 22 illustrates a flow chart of the burner control sub-routine 2200 according to various embodiments of the present disclosure. As illustrated in FIG. 22, after the sub-routine starts, in step 2202, the PLC determines whether the fluid temperature detected by the outlet temperature transmitter 1904 is below a setpoint temperature. If the temperature is below the setpoint temperature, the PLC proceeds to step 2204, where the PLC determines whether flow is detected by the low flow switches 1816.

If flow is detected, in step 2206, the burner 1802 starts, and the routine 2200 proceeds to step 2208. If the fluid temperature is not below the temperature setpoint in step 2202 or if no flow is detected in step 2204, the routine 2200 proceeds to step 2208. In step 2208, the PLC determines whether the fluid temperature is above a high temperature setpoint. If the fluid temperature is not above the high temperature setpoint, the routine 2000 returns to step 2202. If the temperature is above the high temperature setpoint, in step 2210, the burner 1802 turns off. In step 2212, the PLC determines whether the fluid temperature is above a high-high temperature setpoint. If the temperature is not above the high-high temperature setpoint, the routine 2200 returns to step 2202. If the temperature is above the high-high temperature setpoint, the PLC closes the canopy valve 1902 in step 2214.

Figure 23:
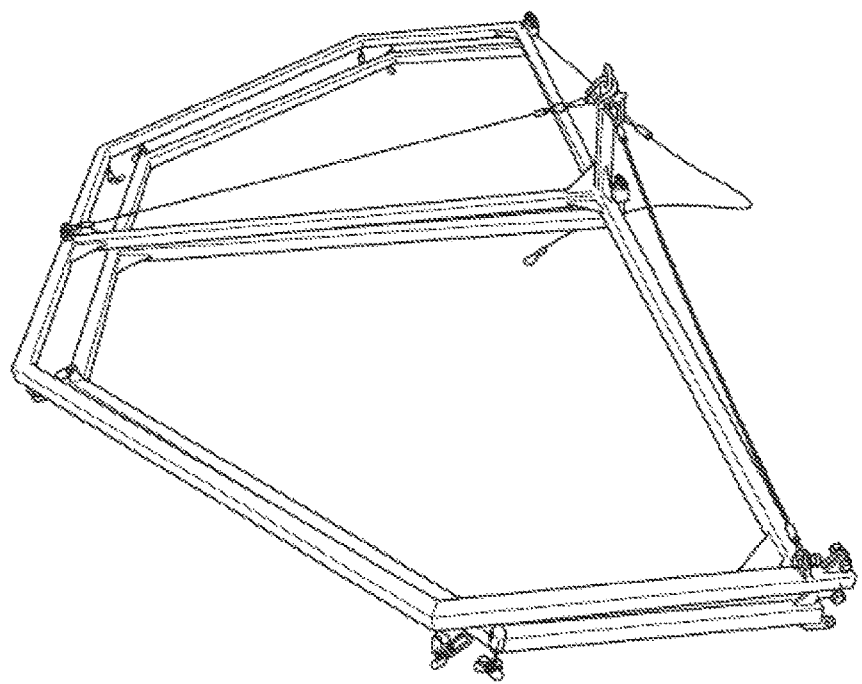
FIG. 23 is a perspective view of another embodiment of a support ring of a treatment portion that is foldable.
Figure 24:
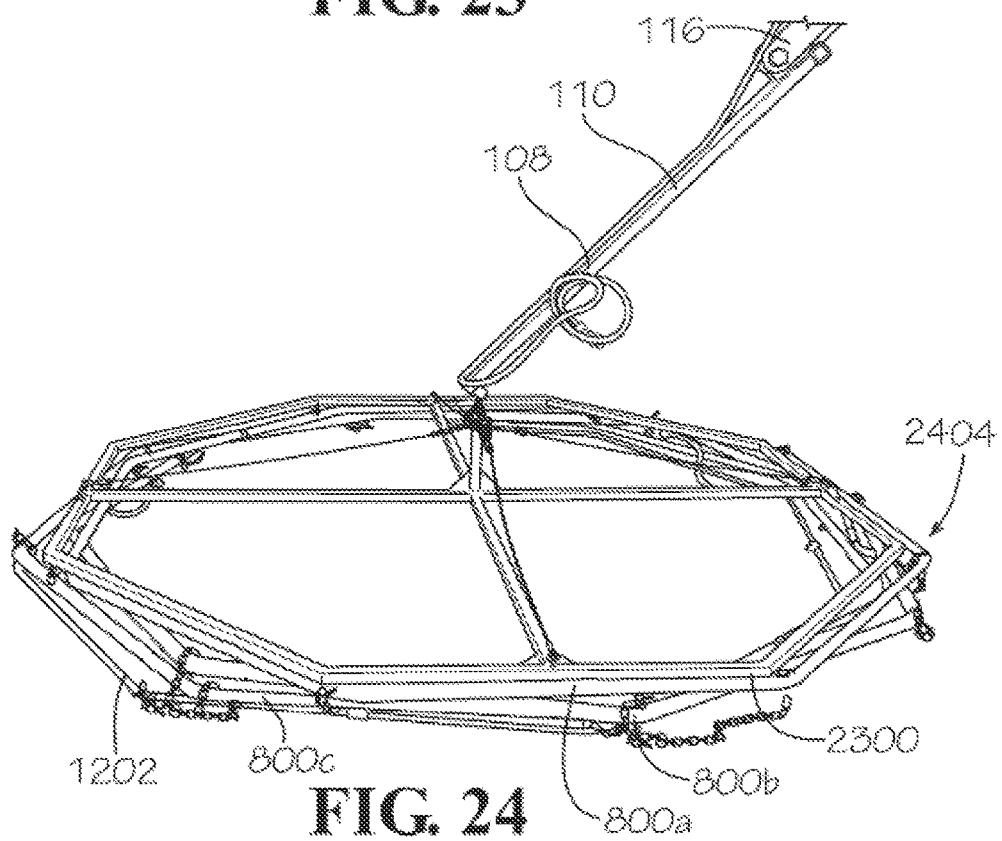
FIG. 24 is a perspective view of an embodiment of a treatment portion with the support ring of FIG. 23 and at a collapsed height.
Figure 25:
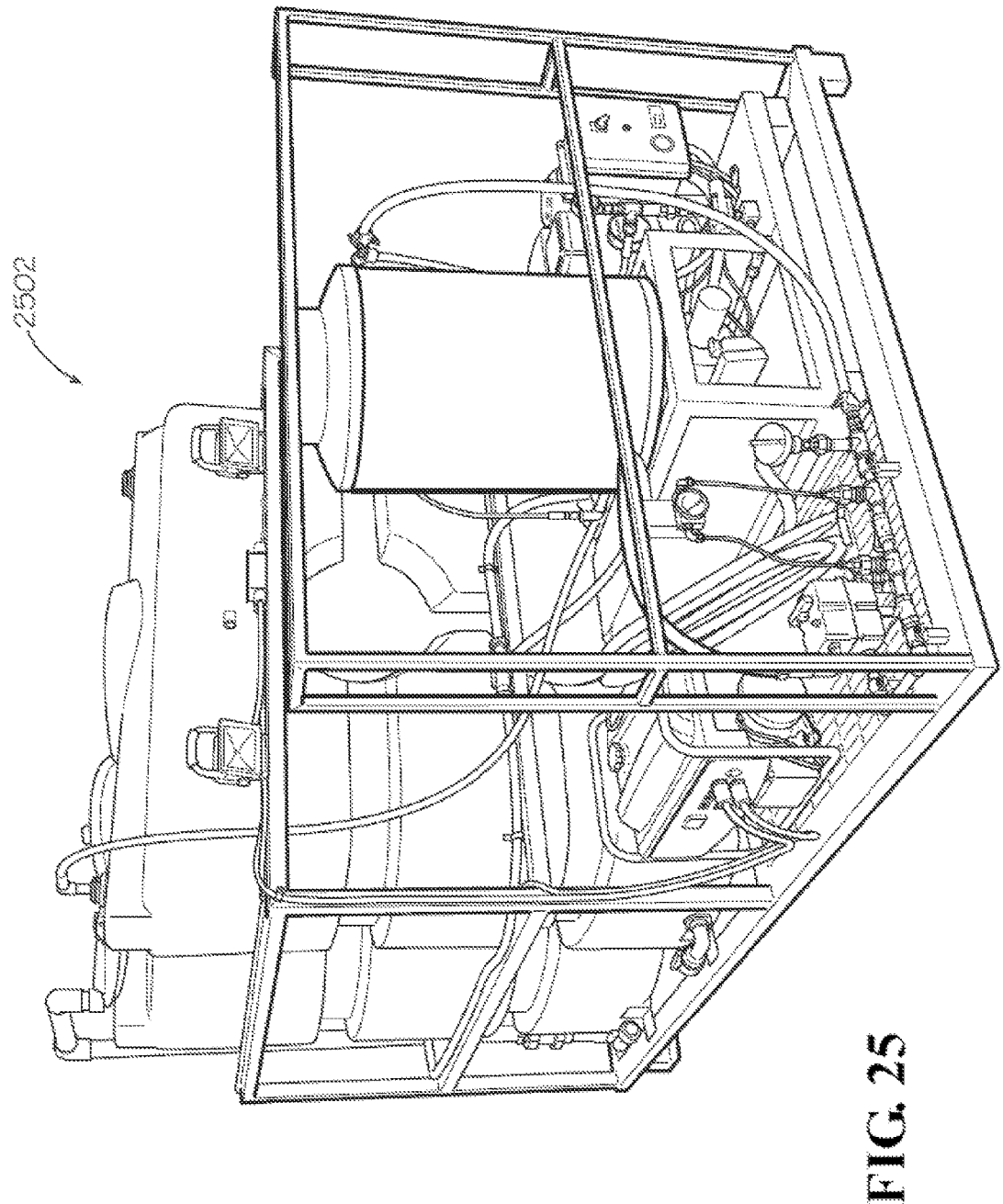
FIG. 25 is a perspective view of another embodiment of a supply portion.
Figure 26:
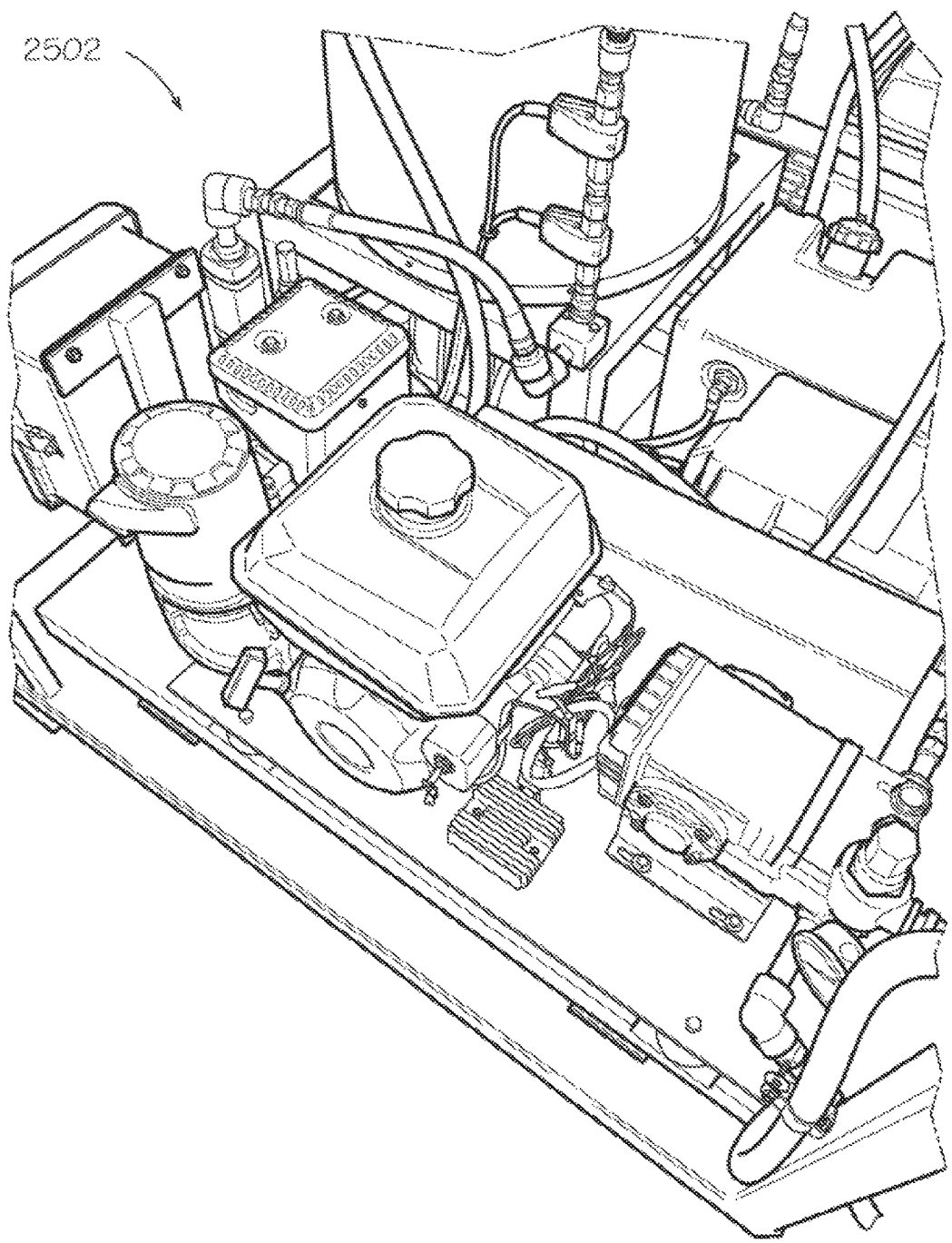
FIG. 26 is another perspective view of the supply portion of FIG. 25.
Figure 27:
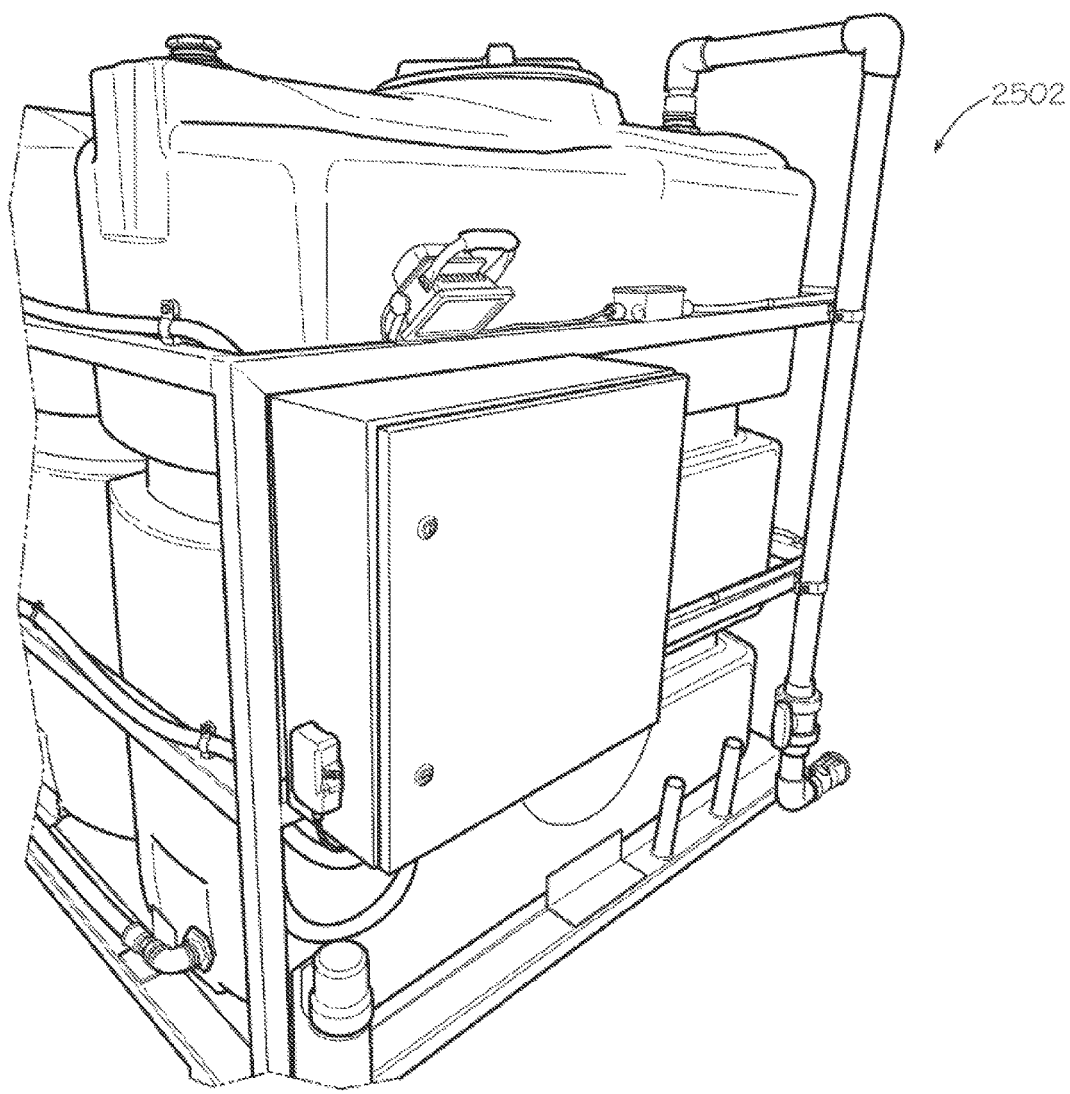
FIG. 27 is another perspective view of the supply portion of FIG. 25.
Figure 28:
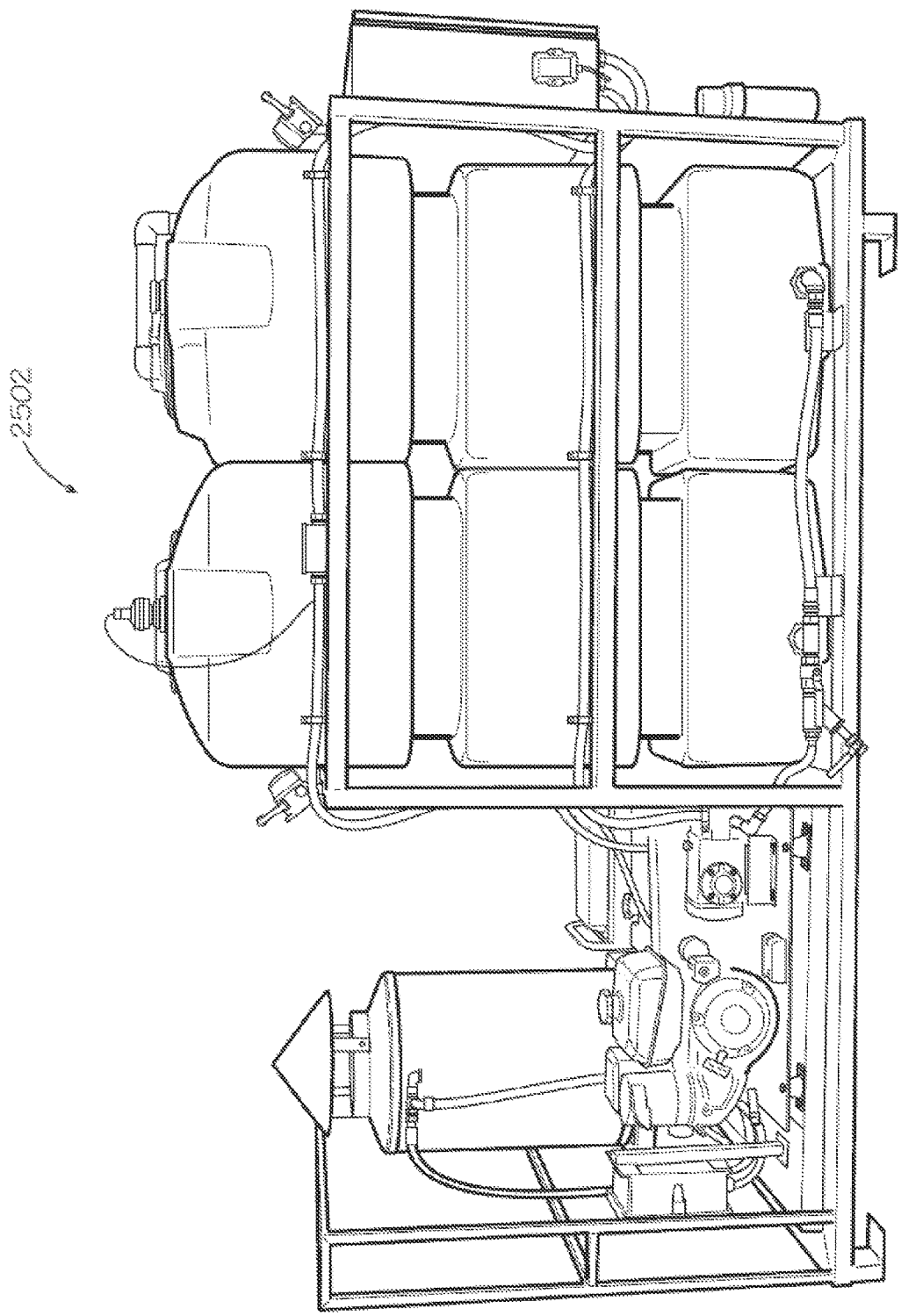
FIG. 28 is another perspective view of the supply portion of FIG. 25.
Figure 29:
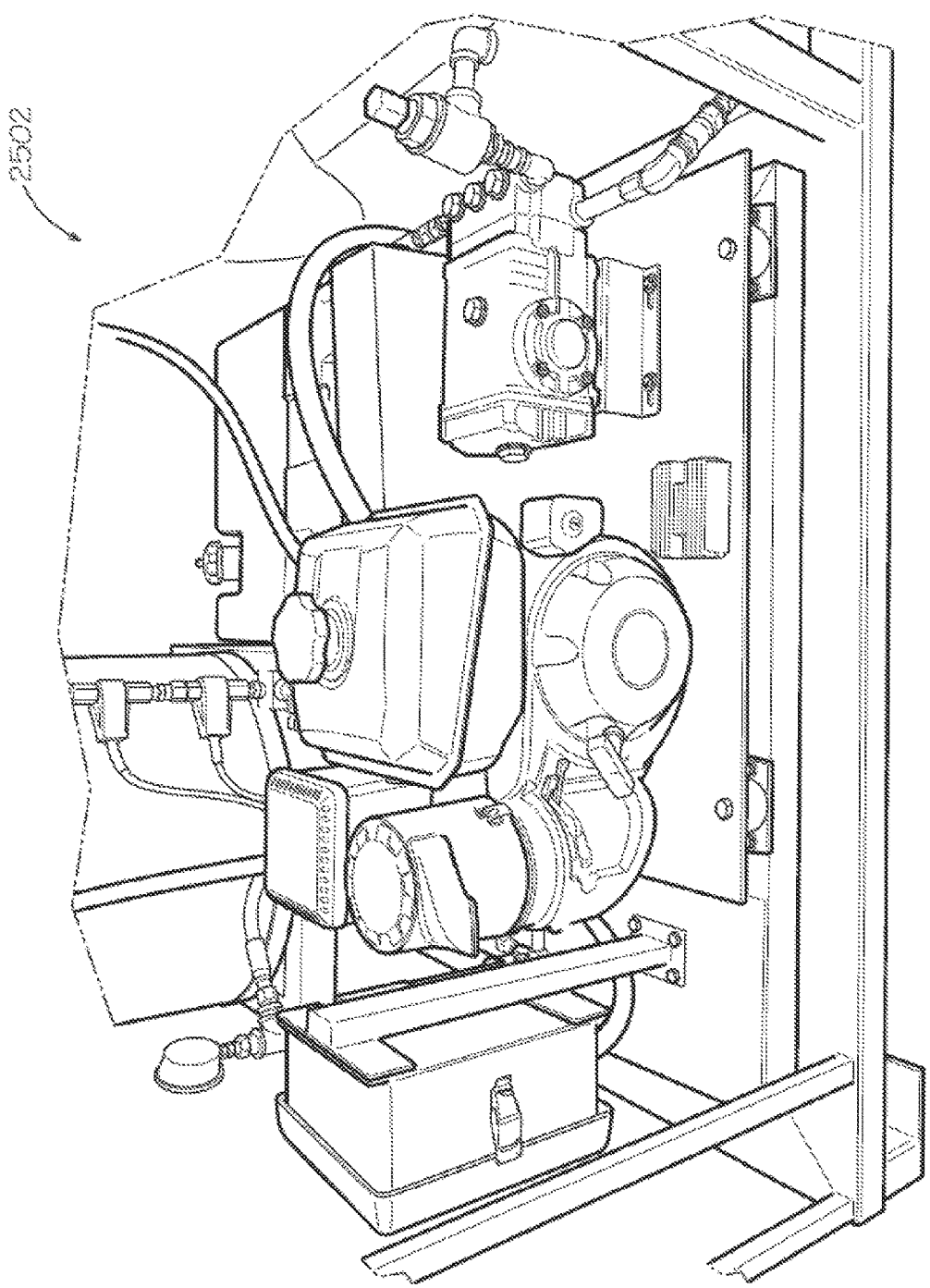
FIG. 29 is another perspective view of the supply portion of FIG. 25.

FIG. 23 shows another embodiment of a support ring 2300. FIG. 24 illustrates another embodiment of a treatment portion 2400 with the support ring 2300 connected to the treatment rings 800 and the base ring 1202. FIGS. 25-29 show another embodiment of a supply portion 2502.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A tree canopy treatment system comprising:
   a supply unit configured to heat a fluid wherein said fluid is a liquid; and
   a treatment unit in fluid communication with the supply unit, the treatment unit configured to move independently from the supply unit, the treatment unit comprising:
      a treatment ring, the treatment ring defining a treatment region, the treatment ring connected in fluid communication with the supply unit, the treatment ring comprising at least one spray nozzle configured to direct the fluid from the supply unit into the treatment region of the treatment unit; and
      a canopy surrounding the treatment ring and enclosing the treatment region; and
   a system controller configured to control a flow rate of the fluid between the supply unit and the treatment unit by selectively opening and closing a canopy valve, the system controller configured to:
      monitor a temperature within a treatment region of the treatment unit, the temperature transmitted to the system controller by a temperature transmitter positioned within the treatment region; and
      control the temperature within the treatment region by:
         increasing the flow rate to the treatment unit when the temperature is below a setpoint temperature, or
         decreasing the flow rate to the treatment unit when the temperature is above the setpoint temperature.

2. The system of claim 1, wherein the supply unit includes:
   a fluid pump; and
   a hot fluid generator.

3. The system of claim 1, further comprising an elevating mechanism, wherein the elevating mechanism is connected to the treatment unit and configured to move the treatment unit independently from the supply unit.

4. The system of claim 3, wherein:
the treatment unit includes a base ring connected to the treatment ring;
a distance between the base ring and the treatment ring defines a treatment unit height;
the treatment unit defines an extended height and a collapsed height; and
the elevating mechanism is configured to move the treatment unit while the treatment unit is at the extended height.

5. The system of claim 3, wherein the treatment unit defines a bottom opening, and wherein the bottom opening is configured to be lowered over a top of a tree by the elevating mechanism.

6. The system of claim 1, wherein the treatment unit includes:
a first treatment ring defining a first treatment region;
a second treatment ring defining a second treatment region; and
a third treatment ring defining a third treatment region, wherein the first treatment region, the second treatment region, and the third treatment region are aligned to define a canopy treatment region.

7. The system of claim 1, wherein the supply unit is mobile.

8. The system of claim 7, wherein the supply unit is mounted on a converted vehicle.

9. The system of claim 1, wherein the canopy fully encloses the sides of the treatment region.

10. The system of claim 1, wherein the treatment ring is fully enclosed.

11. The system of claim 1, wherein:
the canopy valve is configured to control the flow rate of the fluid from the supply unit to the at least one spray nozzle; and
the system is controller connected in electronic communication with the temperature transmitter and the canopy valve, the system controller configured to operate the canopy valve to:
open the canopy valve to increase the flow rate to the at least one spray nozzle when the temperature is below the setpoint temperature; and
close the canopy valve to decrease or stop the flow rate when the temperature is below the setpoint temperature.

12. A tree canopy treatment system comprising:
a supply unit configured to heat a fluid, wherein said fluid is a liquid, the supply unit comprising a canopy valve;
a treatment unit in fluid communication with the supply unit, the canopy valve configured to control a flow rate of the fluid between the supply unit and the treatment unit, the treatment unit defining a treatment region; and
a system controller configured to:
monitor a temperature within a treatment region of the treatment unit, the temperature transmitted to the system controller by a temperature transmitter positioned within the treatment region; and
control the flow rate of the fluid between the supply unit and the treatment unit by selectively opening and closing the canopy valve, the system controller configured to control the temperature within the treatment region by:
increasing the flow rate to the treatment unit when the temperature is below a setpoint temperature, or
decreasing the flow rate to the treatment unit when the temperature is above the setpoint temperature.

13. The system of claim 12, wherein the system controller is configured to control a pressure and a temperature of the fluid flowing between the supply unit and the treatment unit.

14. The system of claim 12, wherein the supply unit includes:
a fluid pump; and
a hot fluid generator.

15. The system of claim 12, wherein the treatment unit includes:
a treatment ring, wherein the treatment ring defines the treatment region; and
a canopy draped around the treatment ring and enclosing the treatment region.

16. A tree canopy treatment system comprising:
a supply unit configured to heat a fluid wherein said fluid is a liquid; and
a treatment unit in fluid communication with the supply unit, the treatment unit defining a treatment region and a bottom opening to the treatment region, the treatment unit comprising a nozzle disposed within the treatment region, the nozzle configured to spray a hot fluid into the treatment region; and
a system controller configured to control a flow rate of the fluid between the supply unit and the treatment unit by selectively opening and closing a canopy valve, the system controller configured to:
monitor a temperature within a treatment region of the treatment unit, the temperature transmitted to the system controller by a temperature transmitter positioned within the treatment region; and
control the temperature within the treatment region by:
increasing the flow rate to the treatment unit when the temperature is below a setpoint temperature, or
decreasing the flow rate to the treatment unit when the temperature is above the setpoint temperature;
an elevation mechanism attached to the treatment unit, the elevation mechanism configured to vertically lower the treatment unit over a top of a tree through the bottom opening; and
a converted vehicle attached to the elevation mechanism opposite from the treatment unit, the elevation mechanism configured to vertically raise and lower the treatment unit relative to the converted vehicle.

17. The system of claim 16, wherein:
the treatment unit defines a top opening opposite from the bottom opening;
the treatment region extends vertically from the top opening to the bottom opening; and
the treatment region is surrounded between the top opening and the bottom opening by a canopy.

* * * * *